United States Patent
Werner et al.

(10) Patent No.: US 9,394,113 B2
(45) Date of Patent: Jul. 19, 2016

(54) MACHINE FOR PROCESSING AND/OR PACKAGING OBJECTS AND METHOD FOR MODIFYING A CONVEYING SECTION OF THIS MACHINE

(75) Inventors: Juergen Werner, Bruckmuehl (DE); Herbert Spindler, Riedering (DE); Thomas Wimmer, Rosenheim (DE)

(73) Assignee: Krones AG, Neutraubling (DE)

( * ) Notice: Subject to any disclaimer, the term of this patent is extended or adjusted under 35 U.S.C. 154(b) by 147 days.

(21) Appl. No.: 13/883,448

(22) PCT Filed: Oct. 20, 2011

(86) PCT No.: PCT/EP2011/068339
§ 371 (c)(1),
(2), (4) Date: May 3, 2013

(87) PCT Pub. No.: WO2012/062549
PCT Pub. Date: May 18, 2012

(65) Prior Publication Data
US 2013/0220774 A1    Aug. 29, 2013

(30) Foreign Application Priority Data

Nov. 8, 2010   (DE) .......................... 10 2010 050 524

(51) Int. Cl.
*B65G 21/06*   (2006.01)
*B65G 37/00*   (2006.01)
(Continued)

(52) U.S. Cl.
CPC ................ *B65G 37/00* (2013.01); *B65B 59/00* (2013.01); *B65G 21/10* (2013.01)

(58) Field of Classification Search
CPC .................................................. B65G 2207/16

USPC ............................... 198/583, 615, 860.1, 617
See application file for complete search history.

(56) References Cited

U.S. PATENT DOCUMENTS

| | | | | |
|---|---|---|---|---|
| 4,012,886 A | * | 3/1977 | Harris et al. | ..................... 53/481 |
| 4,727,708 A | * | 3/1988 | Conforto et al. | ................ 53/534 |
| 6,484,475 B1 | | 11/2002 | Neagle | |

(Continued)

FOREIGN PATENT DOCUMENTS

| | | |
|---|---|---|
| CN | 201372110 | 12/2009 |
| CN | 101746532 | 6/2010 |

(Continued)

*Primary Examiner* — Gene Crawford
*Assistant Examiner* — Lester Rushin
(74) *Attorney, Agent, or Firm* — Davidson, Davidson & Kappel, LLC

(57) ABSTRACT

A machine for processing and/or packaging objects, said machine having horizontal conveying section for conveying articles, packages, and/or packaging units, which conveying section includes a first horizontal conveying device with a conveyor for a first operating mode and replaceable by a further horizontal conveying device with a second conveyor different from the first conveyor to establish a further operating mode. A method for modifying a conveying section of a machine for processing and/or packaging objects, wherein articles, packages, and/or packaging units are conveyed essentially horizontally on the conveying section using of a first horizontal conveying device with at least one conveyor in a first operating mode, and wherein at least one further operating mode is established by replacing the first horizontal conveying device with a further horizontal conveying device including at least one second conveyor which is different from the first conveying means conveyor.

19 Claims, 18 Drawing Sheets

(51) Int. Cl.
  *B65B 59/00* (2006.01)
  *B65G 21/10* (2006.01)

(56) References Cited

U.S. PATENT DOCUMENTS

| | | | |
|---|---|---|---|
| 2005/0056677 A1 | 3/2005 | Talken | |
| 2005/0155840 A1 | 7/2005 | Taylor et al. | |
| 2006/0096844 A1 | 5/2006 | Jones | |
| 2008/0093239 A1* | 4/2008 | Poirier et al. | 206/386 |
| 2009/0194389 A1* | 8/2009 | Kanaris | 198/788 |
| 2009/0277755 A1* | 11/2009 | Spangler et al. | 198/617 |
| 2009/0294253 A1* | 12/2009 | Eisenberg | B65G 47/57 198/601 |
| 2010/0140047 A1 | 6/2010 | Hutter et al. | |
| 2010/0200370 A1 | 8/2010 | Rausch et al. | |
| 2010/0213032 A1* | 8/2010 | Bugge | 198/583 |
| 2010/0270124 A1 | 10/2010 | Heck | |
| 2012/0023866 A1 | 2/2012 | Rabec | |
| 2012/0321418 A1* | 12/2012 | Bohman | 414/222.07 |

FOREIGN PATENT DOCUMENTS

| | | |
|---|---|---|
| CN | 101804913 | 8/2010 |
| DE | 1611901 | 2/1972 |
| DE | 10 2005 010 457 | 9/2006 |
| DE | 102008062580 | 6/2010 |
| EP | 1223105 A1 | 7/2002 |
| EP | 2412636 | 2/2012 |
| WO | WO2010064125 | 6/2010 |

* cited by examiner

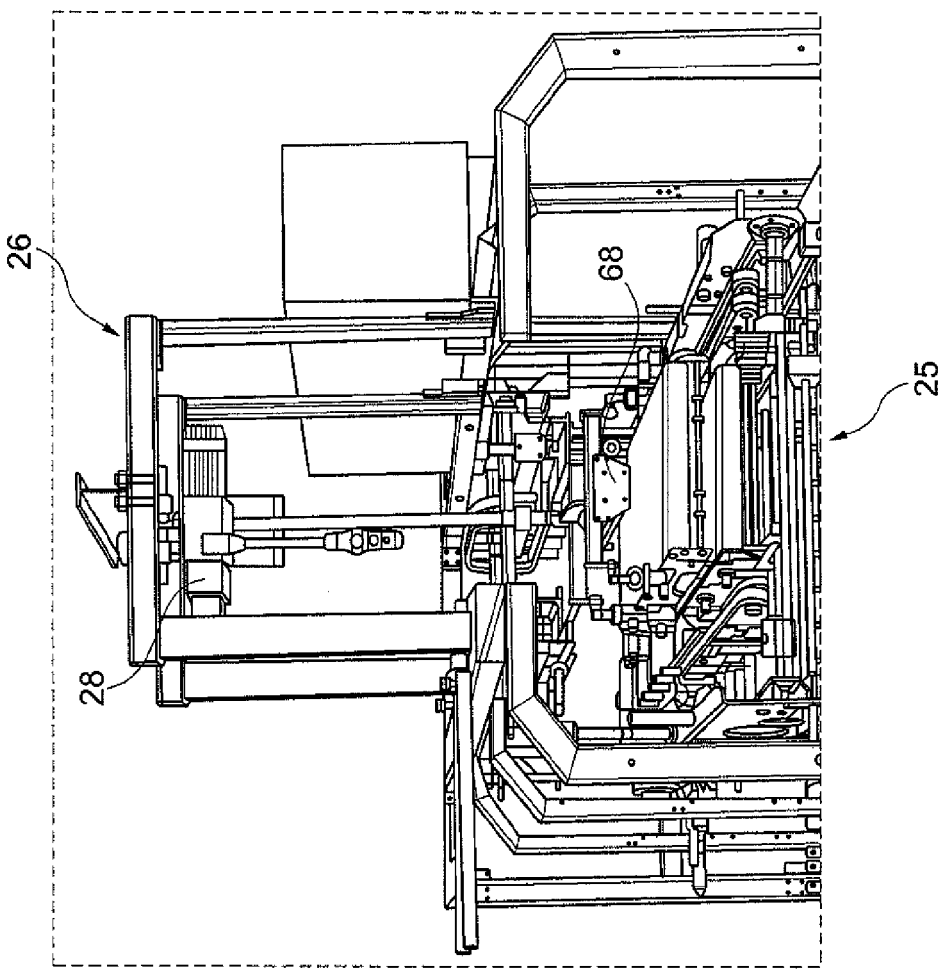
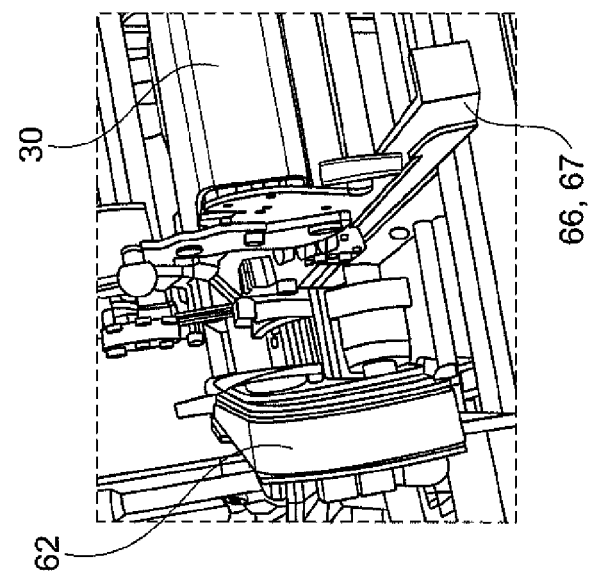
Fig. 11

MACHINE FOR PROCESSING AND/OR PACKAGING OBJECTS AND METHOD FOR MODIFYING A CONVEYING SECTION OF THIS MACHINE

The present invention relates to a machine for processing and/or packaging objects, having an essentially horizontal conveying section. The invention further relates to a method for modifying a conveying section of such a machine.

BACKGROUND

There are a wide variety of packaging alternatives for processing, arranging, grouping, and packaging articles such as beverage containers. PET containers are currently the most commonly used type of containers, for instance for beverages, but they are relatively thin-walled and, even when filled, not completely dimensionally stable. For this reason and for the purpose of improved logistic handling, a wide variety of different packages are used for processing and/or packaging grouped, individual containers. It is possible to place the containers arranged in a group onto a box blank, for instance, with edges that are folded upward. It is also possible to use cardboard blanks corresponding in size to the base size of the arranged packages in order to obviate the work step of folding up the edges. These package arrangements can optionally be wrapped in foil for subsequent heat shrinking, resulting in a stable, easily transportable, and stackable package assembly. The term "shrink only" refers to a further packaging variant in which the arranged containers are simply wrapped in foil and heat shrunk without using any further aids. In this variant, the dimensional stability of the package is ensured solely by the shrinking foil. Currently known machines and their conveying devices are commonly specifically optimized to a certain type, size, and/or contour of conveyor goods. Different types of packages or different packaging alternatives additionally require the use of different, specific conveying devices. In some circumstances, such as changes in products, it is therefore possible that the use of certain conveying devices cannot be continued if these devices are no longer suited to transporting the specific type of individual articles or containers as currently required. There can further be disruptions to the article transporting process if the packaging machines are specifically adjusted to transporting a different product variant. Conveying problems such as these may particularly arise when there are changes from packed goods, such as package units, to loose goods, such as individual beverage containers or the like. Such articles as beverage containers, which are conveyed in a standing position, are prone to toppling over and/or falling down on conveying devices that are adapted for transporting package units, especially if the transport modules are not equipped with conveyor support surfaces that are sufficiently flat and level to safely transport objects with a very small base size.

SUMMARY OF THE INVENTION

It is an object of the present invention to provide a packaging machine with a conveying device or with a conveying section or another kind of packaging machine that is suited and optimized for conveying different types of conveyor goods equally well, without any restrictions regarding the conveying quality for the specific products to be conveyed.

The present invention provides a machine for processing and/or packaging objects, such as beverage containers, said machine having an essentially horizontal conveying section for conveying articles, packages, and/or packaging units. The conveying section comprises a first horizontal conveying device with at least one conveying means for a first operating mode, which horizontal conveying device can be replaced by a further horizontal conveying device with at least one second conveying means that is different from the first conveying means in order to establish at least one further operating mode. In the present context, the terms "replaceable conveying means" or "replaceable horizontal conveying devices" generally relate to the equipment of the conveying section, while the conveying section itself is largely unchangeable in spatial terms. For conveying objects of a defined type and/or for a defined packaging alternative, a segment of this conveying section may optionally be made up of the first or the second horizontal conveying device. This does not, however, necessarily imply that the respective conveying means, which is currently not in use, actually has to be removed from the machine or physically replaced by the conveying means that is intended for being used, but rather that the conveying means, which is currently not in use, is at least moved out of the engagement range and/or the range of action of the conveying section. The respective conveying means currently not in use may, for instance, take a park or rest position in the immediate vicinity of or at a distance from the conveying section, while the respective other conveying means is in the engagement range and forms a part of the conveying section.

The first conveying device with the conveying means for the first operating mode may be, for instance, a multi-part conveyor chain with flap folding fingers that can be pivoted out of the conveying level, such conveyor chains being typically employed for making cardboard trays. For this packaging variant, several articles, such as beverage containers, are grouped together and placed on a cardboard blank, which is conveyed by means of a horizontal conveying device. The flap folding fingers emerging from below the level of conveyance serve for folding upward the front and/or back flap sections of the cardboard blank before the edges are glued or otherwise adhered to one another so as to form a tray. It is also possible to subsequently wrap the articles in shrinking foil to produce complete packaging units comprising a plurality of grouped beverage containers or other articles. The first horizontal conveying device with the conveying means for the first operating mode may optionally be a multi-part conveyor chain with folding elements used for producing cardboard packages for individual articles, also referred to as "wrap-around sleeves". This cardboard package that is folded and, as the case may be, closed on all sides, may optionally be additionally wrapped in a foil, resulting in a particularly sturdy packaging type.

In the present context, the "first operating mode" or the "first operating variant" is understood to refer to the mode in which a segment of the conveying section within the packaging machine is formed by a horizontal conveying device with a conveying means, said horizontal conveying device comprising certain mechanical characteristics which significantly differ from certain characteristics of an alternative conveying means in a second or further horizontal conveying device, which can be employed for a second operating mode. This second operating mode may be characterized in that the articles or containers are to be transported, for instance, without support pads and in a grouped arrangement so that they can be wrapped in a foil, for instance, in a subsequent processing or packaging station, which packaging type is also referred to as "shrink-only" packaging. Articles or containers that are being conveyed in such a manner, standing upright and arranged in groups, but not otherwise fastened or connected to each other, cannot be conveyed on a conveyor chain with flap folding fingers emerging from below the conveying level, as the flap folding fingers would very likely cause the articles or containers to topple over or fall off the conveying surface.

A similar problem arises with packaging types for which the grouped articles or containers are placed on so-called pads to be wrapped in foil in a subsequent processing step. These support pads of cardboard or a synthetic material have no flaps or excess edges extending beyond the articles or containers thereon, and they can therefore not be folded to form a tray that would provide a certain measure of bending stiffness. For this reason, this packaging type requires the horizontal conveying device to have a largely level and flat, smooth conveyor support surface. If two or more parallel conveyor mats are used, the excess edges protruding on the sides and/or the sections of the flexible support pad located between the adjacent conveyor chains tend to sag, resulting in the risk of destabilizing the package arrangement so that individual or several containers or articles could topple over or fall off the horizontal conveying device.

On the other hand, cardboard blanks with lateral flaps for folding upward are frequently not suited to being conveyed purposefully and reliably on even conveyor mats because they tend to slip and become dislodged, thus impairing the conveying quality. Such a conveying device would also lack the mechanical means for folding the cardboard flaps.

In order to solve these difficulties and to enable the universal use of a packaging machine that is suitable for and adapted to conveying and handling tray packages and similar package units so that said packaging machine can be employed for other types of packages as well, the present invention provides a conveying section for the orderly, horizontal conveyance of separate articles, packages, and/or packaging units within a packaging machine, with said conveying section comprising the first horizontal conveying device with the first conveying means, such as at least one endlessly circulating conveyor belt, for the first operating mode. This first horizontal conveying device may be removed, for instance in a horizontal and/or vertical direction, from the range of the conveyance route for the articles, packages, and/or packaging units, and then replaced by a single- or multi-part second horizontal conveying device, each part comprising at least one endlessly circulating support surface. According to the invention, this second horizontal conveying device takes the position of the conveyance route and thus forms that part of the conveying section in the second operating mode that was previously formed by the first horizontal conveying device in the first operating mode before the first horizontal conveying device was removed from the conveyance route.

The first horizontal conveying device may optionally be designed in one or in several parts or it may comprise a single- or multi-part conveying means, as the case may be. The first horizontal conveying device may be formed, for instance, by parallel, circulating conveyor chains, which are adapted for conveying and handling article groups on a support pad, such as a cardboard blank, a tray-like support, or the like. In order to convey these article groups reliably and in the exact position, and additionally offering the possibility, if required, of folding cardboard flaps upward in the process of conveyance, one embodiment variant of the invention may provide pivotable flap folding fingers or the like for the conveyor chains. If designed as a multi-part device, the transporting device or horizontal conveying device according to the invention may comprise, for instance, a parting line running in or parallel to the longitudinal or conveying direction. For the first operating mode, these at least two parts of the first horizontal conveying device are either joined at this parting line or placed at only a slight distance from each other so that the at least two parts function as a single horizontal conveying device. Furthermore, it is possible for the at least two parts of the first horizontal conveying device to be pulled apart at the parting line in both directions to the sides of the conveying section and placed at a distance from each other during the second operating mode. A single-part design, however, will not allow the horizontal conveying device to be separated in this manner. Such a single-part, first horizontal conveying device is preferably shifted to the side or otherwise removed from the range of the conveying section. It is thus possible to adapt the packaging machine for the second operating mode in this variant by shifting the first horizontal conveying device to the side.

The main purpose of making it possible to switch between the first and the second horizontal conveying devices with their respective conveying means so that they can, in each case and according to the respective operating mode, form the same conveyance route for different conveyor goods, is to allow the adaptation to different mechanical characteristics of the specific package units and goods to be conveyed. Chain conveyors that are optimized for the failure-free conveyance of large packaging units on plastic or cardboard pads and, possibly, equipped with folding devices, are per se not suitable for conveying individual articles with a small base size in relation to the support surface, such as beverage containers or bottles, in particular if these articles have a concave base. It is not possible to convey such articles on customary chain conveyors because they would topple or roll off and cause considerable disturbances in the operation of conveying. The invention therefore provides the option of replacing the horizontal conveying devices so that the conveying section can be adapted to and optimized for the specific goods to be transported, in this way allowing an existing packaging machine, which is adapted for conveying and packaging article groups with a sturdy base, to be used alternatively for conveying and packaging other package designs with individual articles, which will be wrapped and packed later on in subsequent steps.

It should be pointed out again that the described possibility of switching between the horizontal conveying devices does not necessarily entail the complete removal of the first horizontal conveying device or the first conveying means from the machine. It is in fact conceivable that at least one of possibly several conveying means of the first horizontal conveying device takes a so-called park position within the machine. This park position is a location within the machine where the devices are placed while they are in a non-operating state and where they will not interfere with the functioning of the machine. The park position may be located within the machine spatially adjacent to, underneath, and/or above the actual transporting level, for instance. With this mentioned option of switching between the horizontal conveying devices, it is therefore absolutely possible to move a part of the first horizontal conveying device, for instance a first conveying means, to a so-called park position, and to subsequently replace it by a second conveying means of a second horizontal conveying device, which is placed in the same section of the machine or in the required location for reconstructing the conveying section.

In a further embodiment variant of the conveying section according to the invention, the second horizontal conveying device may be parted transversely to the conveying direction and may be formed by two or more parts in a second operating mode, which parts are joined to each other or joined one after the other in the direction of conveyance. In this way it is possible during the first operating mode for the multi-part second horizontal conveying device to be set aside in a rest position, for instance, above a conveying level, with at least two parts being vertically stacked on top of each other and/or connected to each other. By means of a hoisting device for vertical lifting and lowering it is furthermore possible to couple the at least two parts of the multi-part second horizontal conveying device into or out of the rest position. In addition, the second horizontal conveying device can be brought into the desired operating position by providing that at least one part of the multi-part second horizontal conveying device is slidable in conveying direction in order to establish the second operating position.

The two or more parts of the second horizontal conveying device are each spaced only slightly apart from each other in the second operating mode, forming one or more gaps or interspaces with the curvature radiuses of the belt tracks in each ease facing toward each other. In this manner, it is possible to prevent containers, which are not wrapped in foil or another packaging means and/or not attached to each other yet, from toppling at this parting line. The second horizontal conveying device enables conveying articles or containers for subsequent wrapping in shrinking foil in a so-called "shrink-only" process, or also a so-called "shrink-pad" process, to hold them together in transportable and stackable package units. An advantageous embodiment variant may moreover provide a non-driven transfer element to bridge or minimize the gap or parting line formed between the conveying means of the second horizontal conveying device, said gap resulting from the conveying means being arranged one after the other in conveying direction. This transfer element may be formed, for instance, by a crosspiece with a triangular profile and a flat top side, and it may be placed in a contact-free manner into the gap and fixed to lateral frame sections. Suitably dimensioned, a crosspiece of this kind may create a nearly uninterrupted transfer and steady conveyance of the articles, objects, or containers gliding across it and thus prevent the risk of unsettling the articles or of articles toppling over at the parting line.

The invention furthermore relates to a method for modifying a conveying section for the orderly, horizontal conveyance of separate articles, packages, and/or packaging units and/or for adapting the conveying section to different conveyor goods, wherein the conveying section, in a first operating mode, is at least partly formed by a first horizontal conveying device with at least one endlessly circulating conveyor belt, which may, for the purpose of switching to a second operating mode, be removed in horizontal and/or vertical direction from the range of the conveyance route for the articles, packages, and/or packaging units and be replaced by a single- or multi-part second horizontal conveying device, each part comprising at least one endlessly circulating support surface, wherein the second horizontal conveying device takes the position of the conveyance route and forms at least a part of the conveying section in the second operating mode.

One embodiment variant of the method provides that the first horizontal conveying device is formed by multiple parts and comprises a parting line in longitudinal or conveying direction, wherein the at least two parts of the first horizontal conveying device are joined together or spaced only slightly apart at the parting line for the first operating mode, the multiple parts thus functioning as a single horizontal conveying device, and wherein the at least two parts of the first horizontal conveying device are pulled apart at the parting line in both directions to the sides of the conveying section and placed at a distance from each other for the second operating mode.

One embodiment variant of the method provides that the second horizontal conveying device is separated in conveying direction and formed by two or more parts in the second operating mode, which parts are joined to each other, wherein the multi-part second horizontal conveying device is set aside in a rest position above a conveying level during the first operating mode, wherein at least two parts of said multi-part second horizontal conveying device are vertically stacked on top of each other and/or connected to each other, and wherein the at least two parts of the multi-part second horizontal conveying device are coupled into or out of the rest position by means of a hoisting device for vertically lifting and lowering said horizontal conveying device.

Finally, the method according to the invention may be reasonably supplemented in that at least one part of the multi-part second horizontal conveying device is slidable in conveying direction in order to establish the second operating position.

It is furthermore particularly advantageous in all of the variants described above for each part of the multi-part second horizontal conveying device to be couplable to the same drive of the conveying section. For this purpose, the replaceable horizontal conveying devices are preferably provided with uniform connecting wheels or coupling devices or the like, which, on being anchored in the area of the conveying section, establish the operative connection between the belt drives and the circulating belts or chains. Mat conveyors, chain conveyors, belt conveyors, or the like, may in particular be used as horizontal conveying devices in this configuration. Conveying devices with relatively flat, smooth surfaces are preferably used for conveying individual articles or containers, whereas chain conveyors frequently have a pronounced profile and relatively narrow support surfaces and can therefore only be employed for conveying accordingly suitable packaging units, such as so-called trays or shells for receiving articles, said trays forming a relatively sturdy base, or cardboard pads with lateral flaps for folding upward if required.

A further, hitherto unmentioned variant, which is nevertheless encompassed by the scope of the invention, may optionally provide the possibility of converting the conveying means used for the horizontal conveying device to modify the conveying section, rather than replacing the horizontal conveying devices. Such a conversion may be effected by inserting support elements into existing conveyor chains to form a largely level support surface, which is thus made suitable for transporting and conveying grouped articles without placing them on additional support elements or for transporting grouped articles on flexible, buckling pads. As a rule, references to replacement or conversion or switching processes in the present context imply that one conveying means is deactivated and another conveying means is activated, but it should be pointed out here that these references may generally also imply that a conveying means is converted and left in its location with the purpose of extending its suitability for other article groups. It is also generally possible to perform this kind of conversion by equipping a previously even support surface with engagement and/or manipulation elements, such as are required for folding cardboard flaps. For this purpose, an even support surface may be provided with openings, for instance, through which flap folding fingers can emerge and descend.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 6 to FIG. 18 show the consecutive process steps required for converting or modifying the packaging machine.

DETAILED DESCRIPTION

Figure 1:
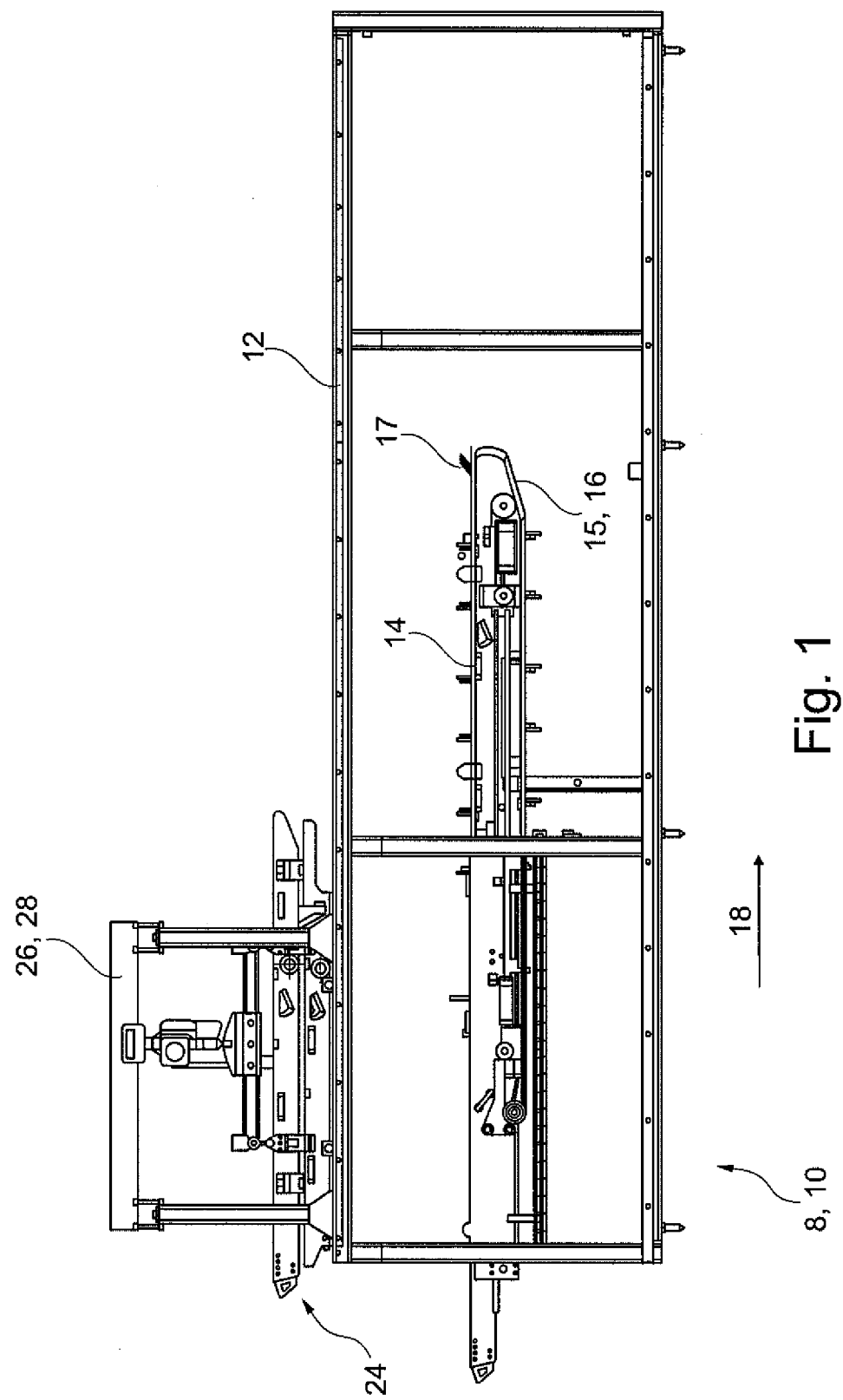
FIG. 1 shows a machine base frame of a packaging machine with a conveying section for articles in a schematic side view.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

Figure 2:
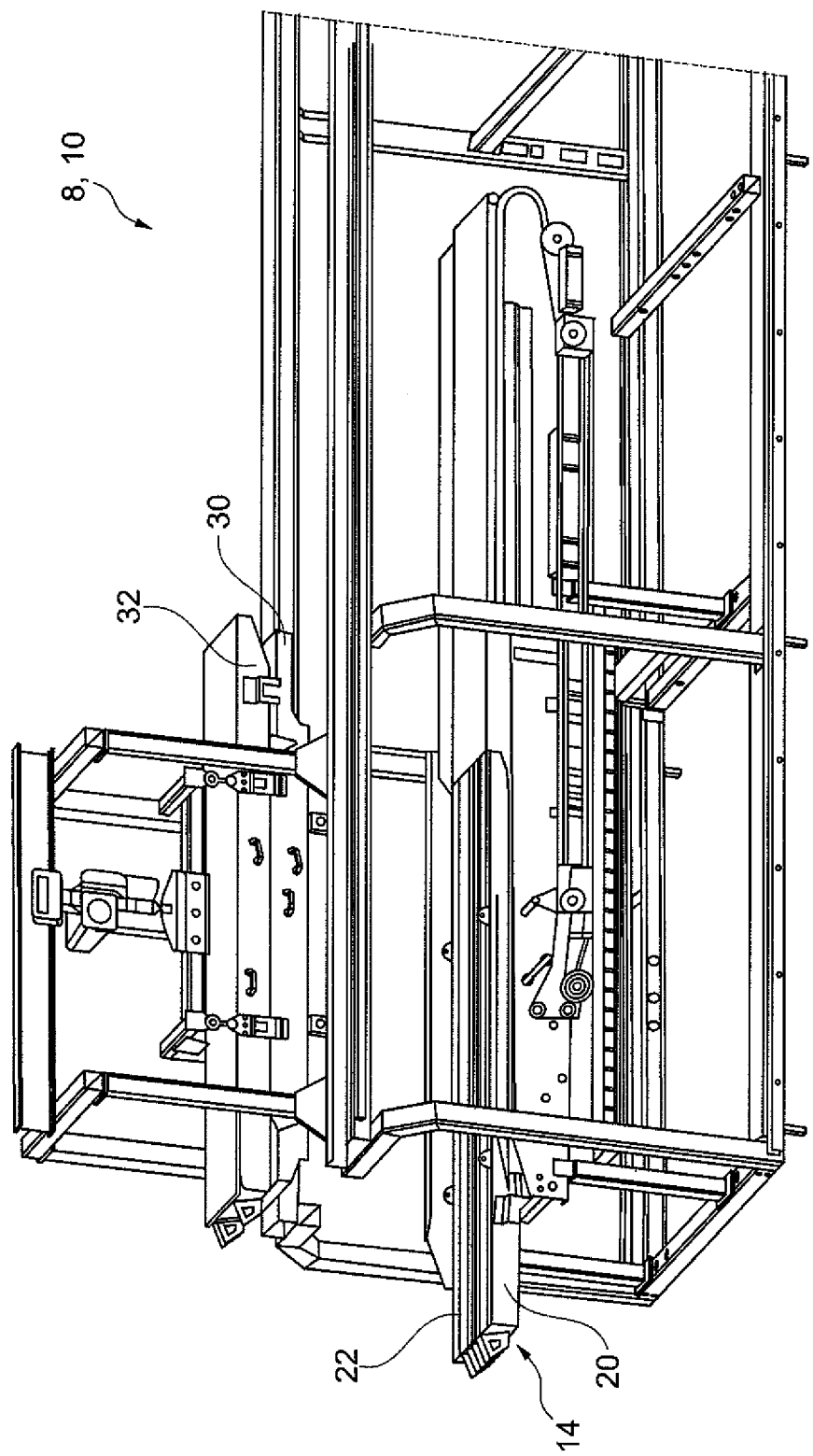
FIG. 2 gives a perspective illustration of the machine base frame.

The schematic side view in FIG. 1 and the perspective view in FIG. 2 show an exemplary embodiment to illustrate the arrangement of a conveying section 10 according to the invention and intended for the orderly, horizontal conveyance of separate articles, packages, and/or packaging units, which are not shown here. The conveying section 10 runs horizontally within a machine base frame 12 of a packaging machine 8 or another conveying machine for articles and packaging goods and it comprises a first horizontal conveying device 14 with a first conveying means 15 in the form of an endlessly circulating conveyor chain or conveyor belt 16, which in the illustrations in FIGS. 1 and 2 is ready for operation, i.e. in a state referred to in the present and following contexts as "first operating mode". The conveyor belt 16 in the illustrated exemplary embodiment is provided with a number of manipulation elements 17, which may be designed and function as flap folding fingers or as divider fingers, for instance. These manipulation elements 17, which are designed as flap folding fingers, in particular serve for folding upward the edges of cardboard pads (not shown here) while they are being conveyed, in this way forming so-called trays for the containers placed and conveyed on said cardboard pads.

As illustrated in FIG. 2, the first horizontal conveying device 14 or the first conveying means 15, which, as the case may be, forms the conveying section 10 in FIGS. 1 and 2, is designed in multiple parts and comprises a parting line running lengthwise or in conveying direction 18. The two parts, i.e the right half 20 and the left half 22 of the first horizontal conveying device 14 are joined or only spaced apart at the parting line for the first operating mode, thus functioning, as the case may be, as a single horizontal conveying device 14 or as a single first transport means 15, the more so as the belt sections circulating on said horizontal conveying device 14 or transport means 15 are moving at synchronous circulation speeds. According to the described embodiment variant of the present invention, the two halves 20 and 22 of the first horizontal conveying means 14 may be pulled apart at the parting line in both directions to the sides of the conveying section 10 and thus separated from each other to establish the second operating mode. The resulting space allows the installation of, in particular, a two-part, second horizontal conveying device 24, of which both parts each comprise endlessly circulating support surfaces. According to the invention, this second horizontal conveying device 24 takes the position of the conveyance route and thus forms that part of the conveying section 10 in the second operating mode that was previously formed by the first horizontal conveying device 14 in the first operating mode before said first horizontal conveying device 14 was separated and shifted to the sides.

During the first operating mode, when the first horizontal conveying device 14 forms the conveying section 10, the second horizontal conveying device 24 may be packed into a module and placed, for instance, in a superstructure 26 above the machine base frame 12, said superstructure 26 being designed as a gantry crane 28 for vertically lifting and lowering the replaceable module. The module may thus be moved between the conveying level of the conveying section 10 and a stacking or depositing level within the superstructure 26.

The second horizontal conveying section 24 forms a second conveying means 25 and may be designed in multiple parts, as shown in the exemplary embodiment. The second conveying means 25 may, in particular, consist of two segments, which are parted transversely to the conveying direction. According to the embodiment variants shown in the figures, for instance in FIGS. 3 and 4, the second conveying means 25 is formed by two parts 30 and 32, which are joined together in conveying direction 18 in the second operating mode. In the first operating mode (FIG. 1, FIG. 2), the two-part second horizontal conveying device 24 or the two-part second conveying means 25, as the case may be, can be set aside in its rest position above the conveying level, with the two parts 30 and 32 preferably being vertically stacked on top of each other and, for instance, additionally connected to each other. For switching to the second operating mode, the two joined parts 30 and 32 of the second horizontal conveying device 24 may be lowered from the superstructure 26 into the conveying section 10 and lifted up from there again by means of the gantry crane 28 that functions as a hoisting device for vertical lifting and lowering. It is additionally possible to bring the second horizontal conveying device 24 or, as the case may be, the second conveying means 25, into the desired operating position and to establish the second operating mode by decoupling the lower part 30 (FIGS. 1 and 2) of the two-part second horizontal conveying device 24 from the upper part 32 and then shifting the lower part 30 in conveying direction 18 (FIG. 3), before the upper part 32 is lowered to its installation location (FIG. 4), which is immediately below the superstructure 26. This embodiment or arrangement of the second horizontal conveying device 24 therefore does not involve lengthwise or transverse shifting of the upper part 32 in order to establish the second operating mode.

Figure 3:
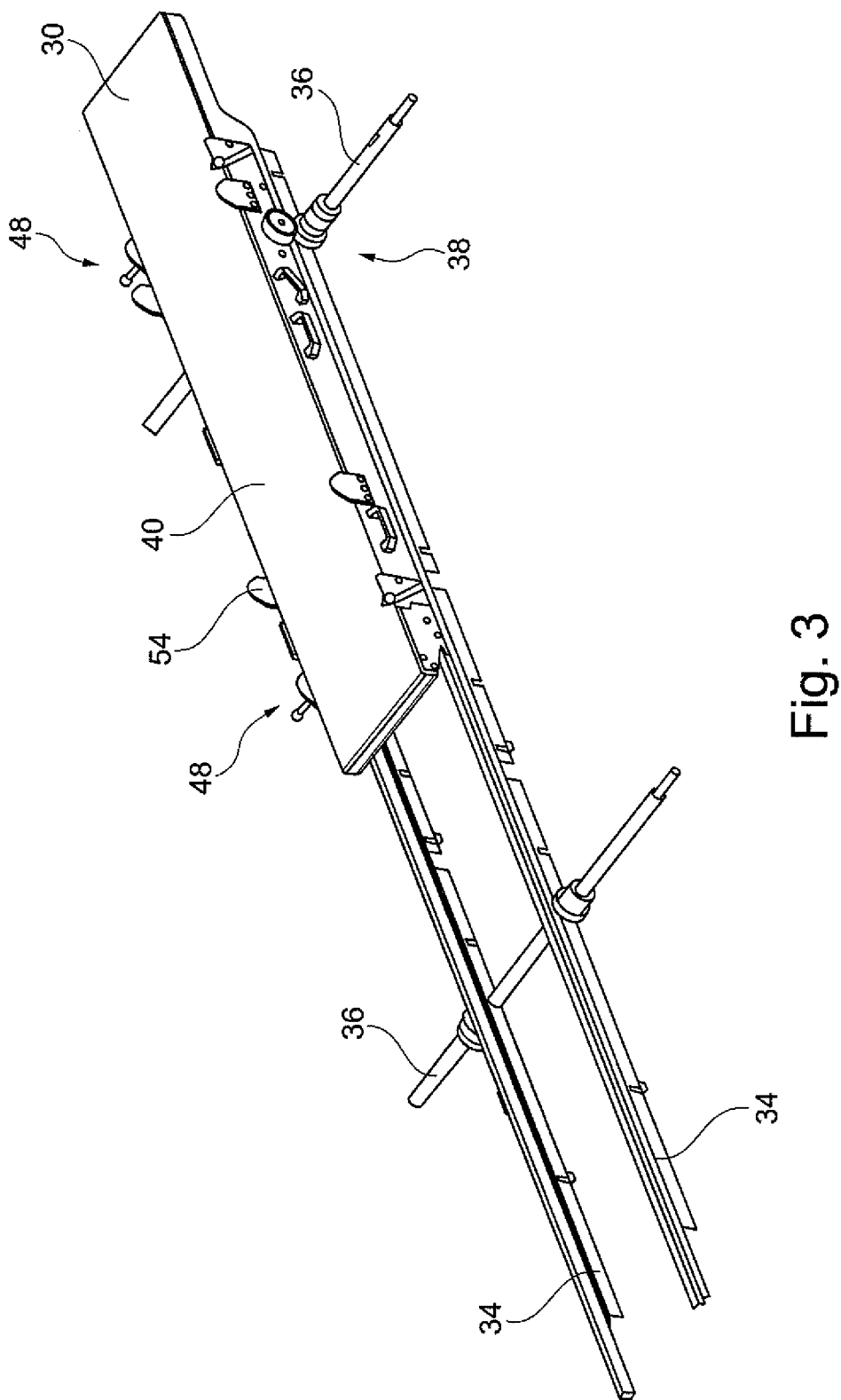
FIG. 3 shows a perspective view of one part of a horizontal conveying device.
Figure 7:
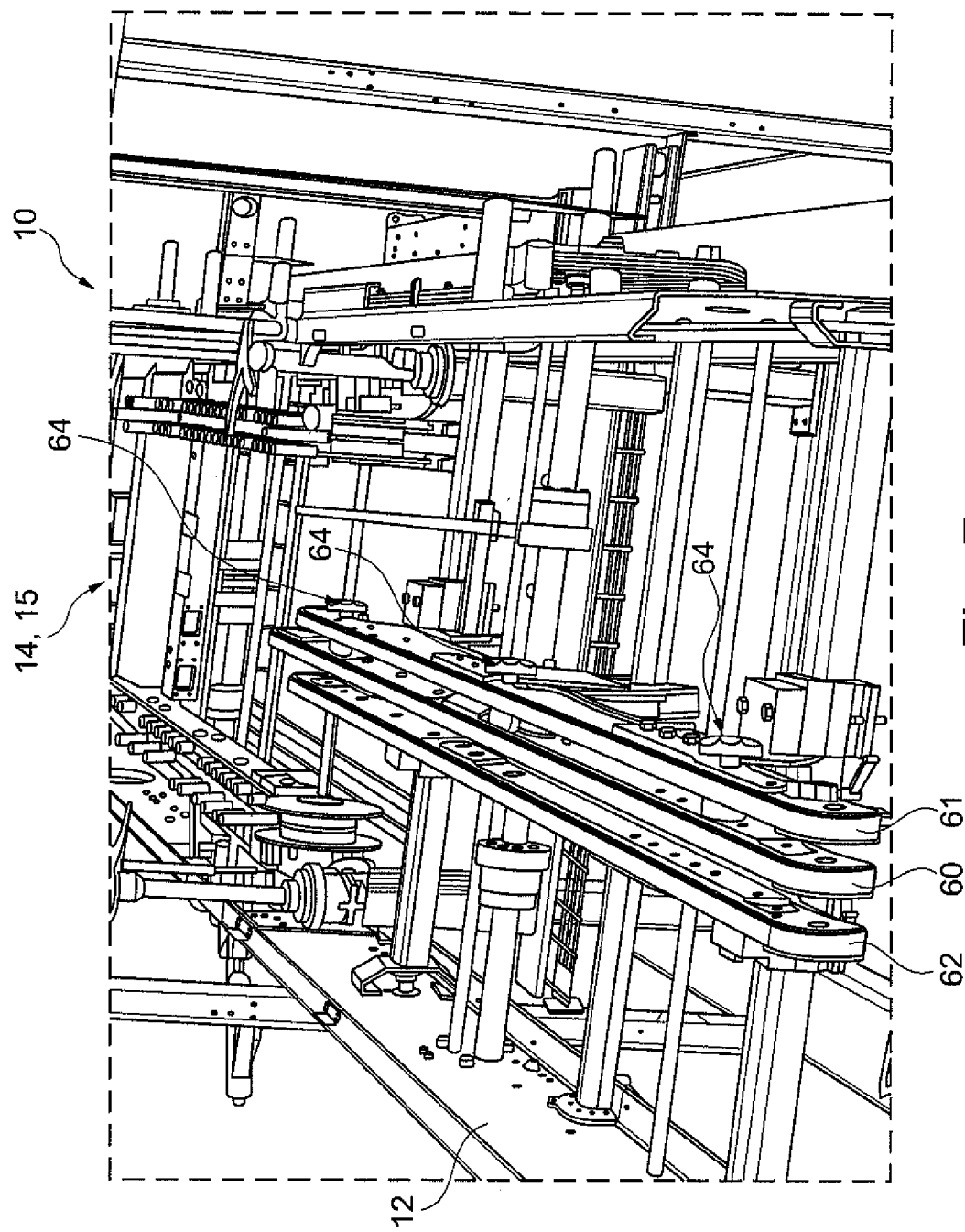

The schematic perspective presentation in FIG. 3 illustrates how the two parts 30 and 32 of the second conveying device 24 are joined together by placing them aligned one behind the other on longitudinal rails 34 of the machine base frame 12 and securing them in place so that they form the second transport means 25. Furthermore, there are drive shafts 36 journaled in the longitudinal rails 34, which drive shafts 36 serve for transmitting a rotary drive movement from a machine drive (not shown here) to the drive rolls (not shown here) by means of a gear pair 38 with spur or helical gearing, said transmission being provided for the purpose of driving the conveyor mats 40 or the conveyor belt 16 of the first horizontal conveying device 14 (FIG. 1). The drive shafts 36 may alternatively be journaled, for instance (not shown here), separately below the longitudinal rails 34 in the sides or other load-bearing segments in the machine base frame 12 of the machine 8, as shown in FIG. 7, for example.

Figure 4:
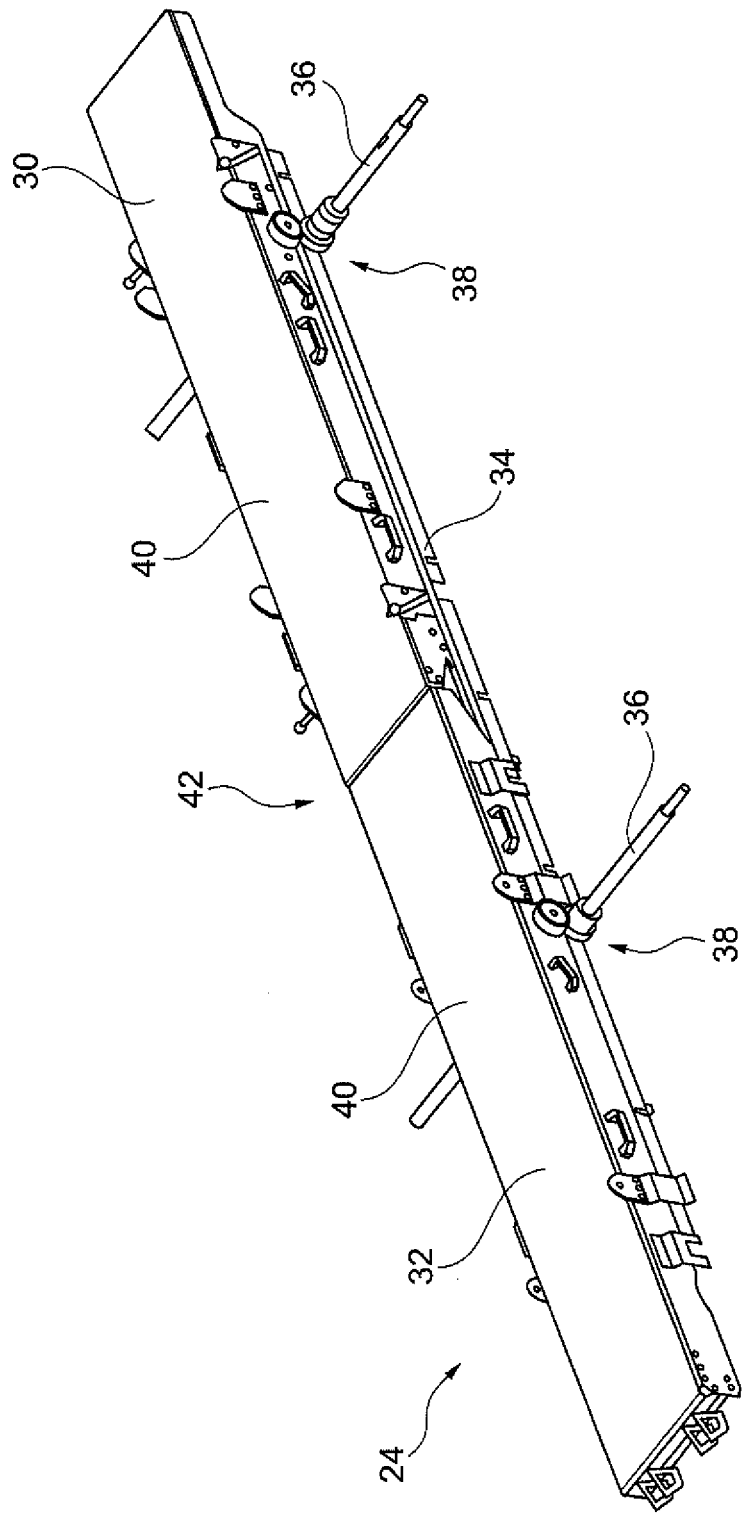
FIG. 4 shows a further view of two parts of the horizontal conveying device according to FIG. 3.

According to FIG. 4, the two parts 30 and 32 of the second horizontal conveying device 24 are spaced only very slightly apart from each other in the second operating mode, resulting in a very narrow gap or interspace 42 with the curvature radiuses of the belt tracks in each case facing toward each other. The smaller the curvature radiuses of the belt tracks are, the closer the parts 30 and 32 may be pushed together, and the smaller is the resulting gap at the transfer point, which is an important condition for smooth and failure-free conveying of containers, bottles, or articles, as these conveyed articles could easily be unsettled and topple over at a larger gap. The curvature radius of the belt tracking may reasonably range to approximately 10 mm or less, for instance, resulting in a gap size that is also approximately 10 mm or less. The lower limit for a reasonable curvature radius is defined by the flexibility or deflectability of the conveyor mat 40. On deflecting beyond its material limits, the conveyor mat 40 would no longer run smoothly, but rather start to track off at the deflection roller and run unevenly, also causing the conveyed articles to be unsettled.

An advantageous embodiment variant may furthermore provide a non-driven transfer element (not illustrated here) to bridge or minimize the gap 42 or parting line formed between the conveying means 25 of the second horizontal conveying device 24, said gap 42 resulting from the conveying means 25 being arranged one after the other in conveying direction 18. This transfer element may be formed, for instance, by a crosspiece with a triangular profile and a flat top side, and it may be placed in a contact-free manner into the gap 42 and fixed to lateral frame sections of the machine base frame 12 and/or attached in the area of the longitudinal rails 34. Suitably dimensioned, a crosspiece of this kind may create a nearly uninterrupted transfer and steady conveyance of the articles, objects, or containers gliding across it and thus prevent the risk of unsettling the articles or of articles toppling over at the parting line.

The purpose of making it possible to switch between the first and the second horizontal conveying devices 14 and 24 in the described manner, wherein the conveying devices 14 and 24 both form the same conveying section 10 for different conveyor goods or package units according to the respective operating mode, is to allow the adaptation to different characteristics of the specific goods to be conveyed, in particular in terms of the requirements concerning the moving surface of the conveying means 15, 25. Chain conveyors that are optimized for failure-free conveyance of large packaging units or packages with sturdy plastic or cardboard bases, or similarly suited or optimized chain conveyors, are entirely unsuitable for conveying individual articles with a small base size, such as beverage containers or bottles. As articles of this kind tend to topple over or roll off the conveyor belts or chains of customary chain conveyors, it was hitherto not possible to employ packaging machines with such chain conveyors for processing package units in so-called "shrink-only" configurations or in so-called "shrink-pad" configurations. In this process, individual containers are assembled in package arrangements, either with or without a so-called "pad" as a support, and then conveyed together to a foil wrapping apparatus or the like. The invention enables switching between different horizontal conveying devices in order to adapt and optimize the conveying section for the specific goods to be conveyed.

Figure 5:
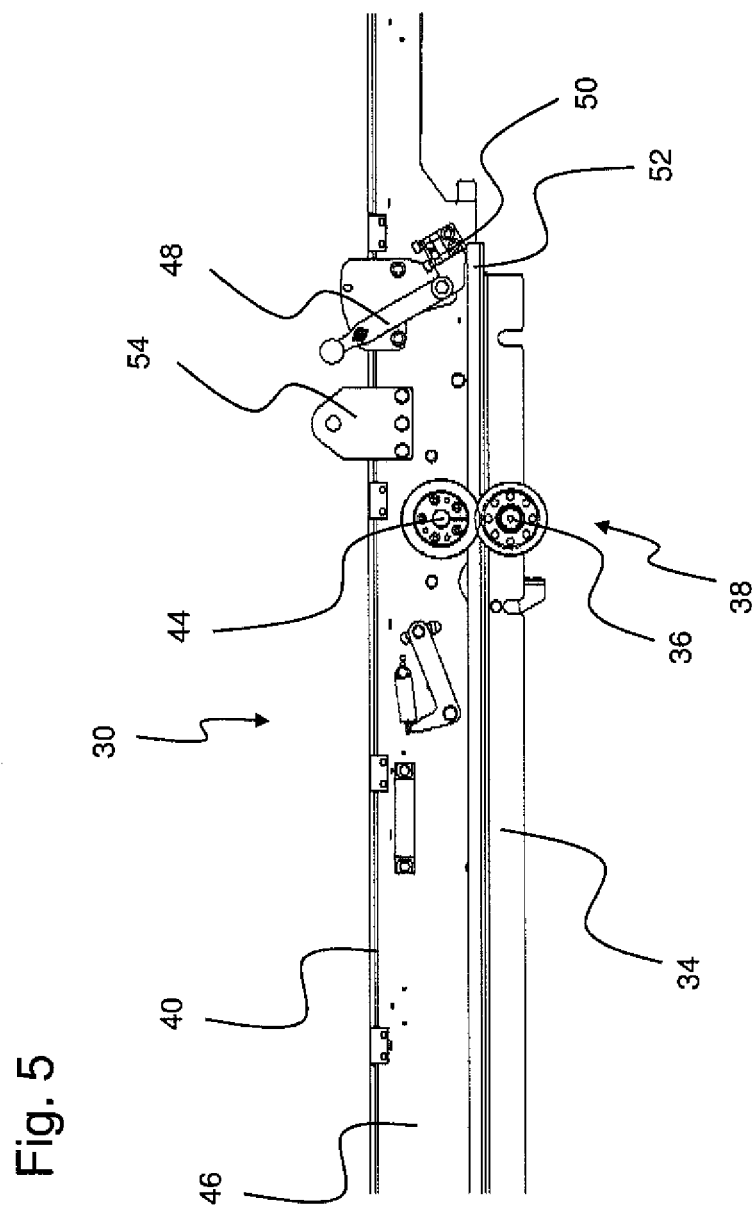
FIG. 5 gives a detailed lateral view of one part of the horizontal conveying device according to FIG. 3.

The lateral view in FIG. 5 shows a detailed partial illustration of the front or lower part 30 of the horizontal conveying device 24 according to FIG. 3. The gear pair 38 for rotary drive transmission from the drive shaft 36, which is journaled in the longitudinal rail 34, to the drive roll 44 for driving the conveyor mat 40 is clearly discernible. The longitudinal rail 34 at the same time supports the rack 46 of the part 30, which has several further functional elements arranged along its longitudinal sides. These comprise, for instance, a pivotable, manually actuable clamping lever 48, which interacts with a clamping jaw 50, which in turn serves for detachably engaging in a clamping rail 52 arranged in the longitudinal side of the longitudinal rail 34. Preferably several and typically at least four of such clamping levers 48 are provided, as indicated in FIG. 3.

These manually actuable clamping levers 48 further serve for switching the conveying means 25 between a working mode (position for operational readiness) and a transporting or switching mode (position for being moveable in a longitudinal direction along the rails 34). As will also be illustrated by the FIGS. 12 to 15, the lower part 30 of the second conveying means 25, which has been lowered into the longitudinal rails 34, may be lifted by a small distance of, for instance, approximately 5 mm by means of the clamping lever 48 in order to lock the module in the working mode. When completely lowered, however, the module 30 may be moved along the longitudinal rails 34 in conveying direction 18 in order to bring the module 30 to the desired end position or to remove it from there. After reaching the end position, the clamping levers 48 are pivoted to lift the module 30 and thus securely fasten it within the machine base frame 12. Should it be necessary to remove the module 30 from the conveying section 10, said module 30 first has to be lowered again by actuating the clamping lever 48, so that the module 30 may then be shifted along the longitudinal rails 34 in the direction opposite the conveying direction 18.

Arranged at the longitudinal sides of the rack 46, there are furthermore several drawbar eyes 54, which serve the purpose of connecting the module 30 to appropriate hooks on the gantry crane 28 or to the second part 32 of the conveying device 24 in the first operating mode, when the lower part 30 is fastened to the upper part 32 and both parts are suspended in the superstructure 26 above the conveying level.

It is furthermore particularly advantageous in all of the variants described above for the replaceable horizontal conveying devices 14 and 24 to each be couplable to the same drive of the conveying section, and this is realized in a simple manner by means of the drive gear pairs 38 with vertically interlocking gear teeth. For this purpose, the replaceable horizontal conveying devices 14 and 24 are each provided with uniform connecting wheels and coupling devices, etc., which, on being anchored in the area of the conveying section 10, establish the operative connection between the belt drives and the circulating belts or chains.

This illustrates only one possible variant of driving the replaceable horizontal conveying devices 14 and 24. Furthermore, it is quite conceivable to provide the horizontal conveying devices 14 and 24 or, as the case may be, the conveying means 15 and 25, each with their own, separate drives, for instance with flange mounted electric motors or the like (not illustrated here). The advantageous possibility described above for driving the replaceable horizontal conveying devices 14 and 24 should be considered as illustrative and not restrictive in character, as there is a multitude of other possibilities available to drive the conveying means 15 and 25. It is for instance possible to provide a specific, own drive for each of the two conveying means 25 of the second horizontal conveying device 24, wherein one drive is already present in the machine 8, leaving only this second conveying means 25 to be equipped with one more drive. It should be noted that numerous other possibilities and variants are available to those skilled in the art, and that according changes or modifications can be made without departing from the spirit of the invention or leaving the scope of protection.

The FIGS. 6 to 18 as described in the following sections demonstrate, by means of an exemplary embodiment, the process of switching from the use of chain conveyors, which are suitable for the horizontal conveyance of package units with a sturdy base, and replacing said chain conveyors by two-part conveyor modules instead. Such a conversion usually has to be performed by at least two people, who are normally required to adhere to the described sequence of operations. If circulating chains are used for forming packages, for instance chains with moveably attached flap folding fingers or the like, said circulating chains first have to be laterally shifted to the longitudinal sides of the conveying section 10. It may furthermore be necessary to position drive elements for the conveyor modules that are to be installed. These may be drive gears, for instance, which may be shifted in an axial direction along the drive shafts and preferably lock into defined positions so that the teeth of the drive gears of the conveyor modules, which will be installed in a vertical direction in a subsequent process step, may engage with the drive gears of the packaging machine 8.

Figure 6:
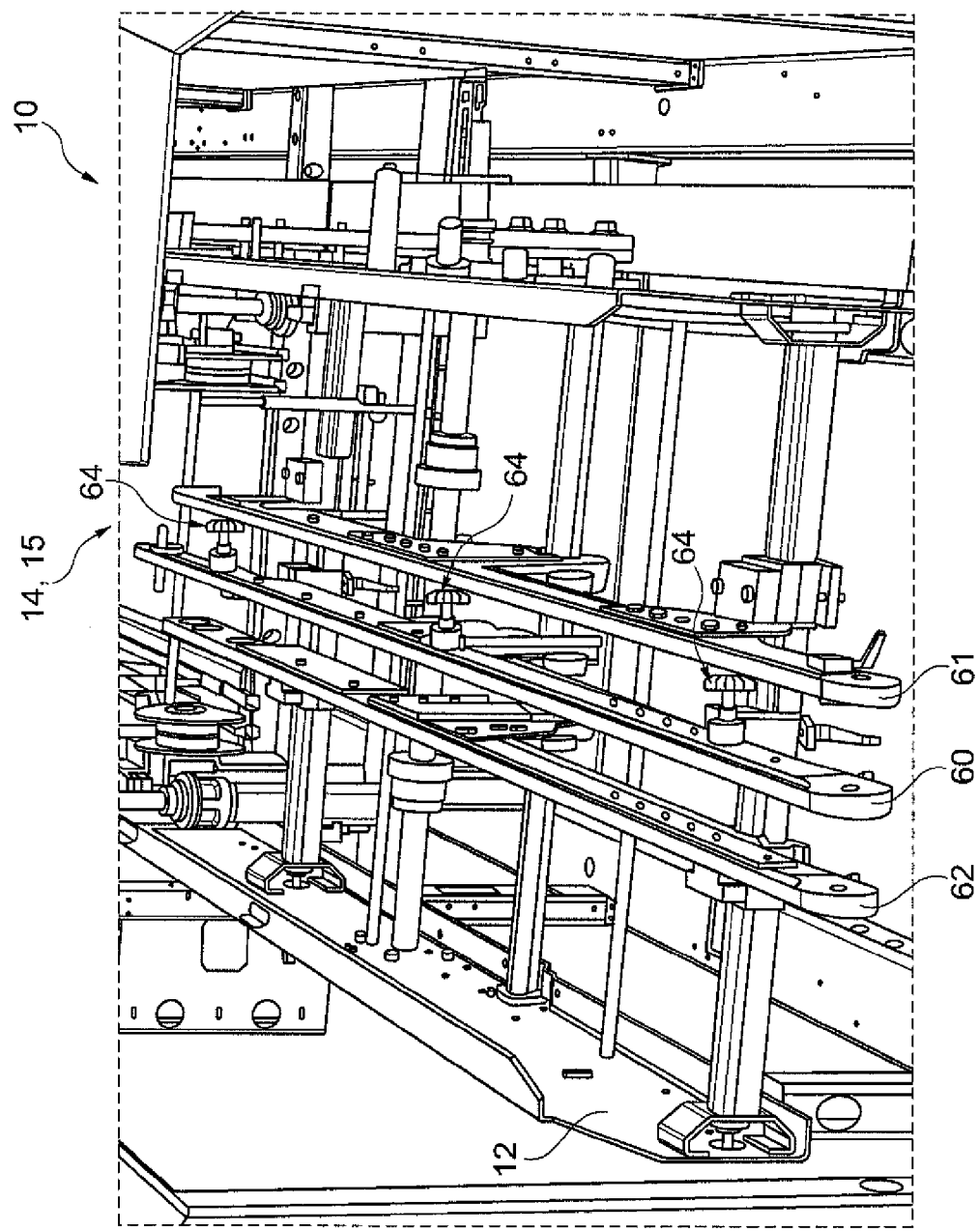
Figure 8:
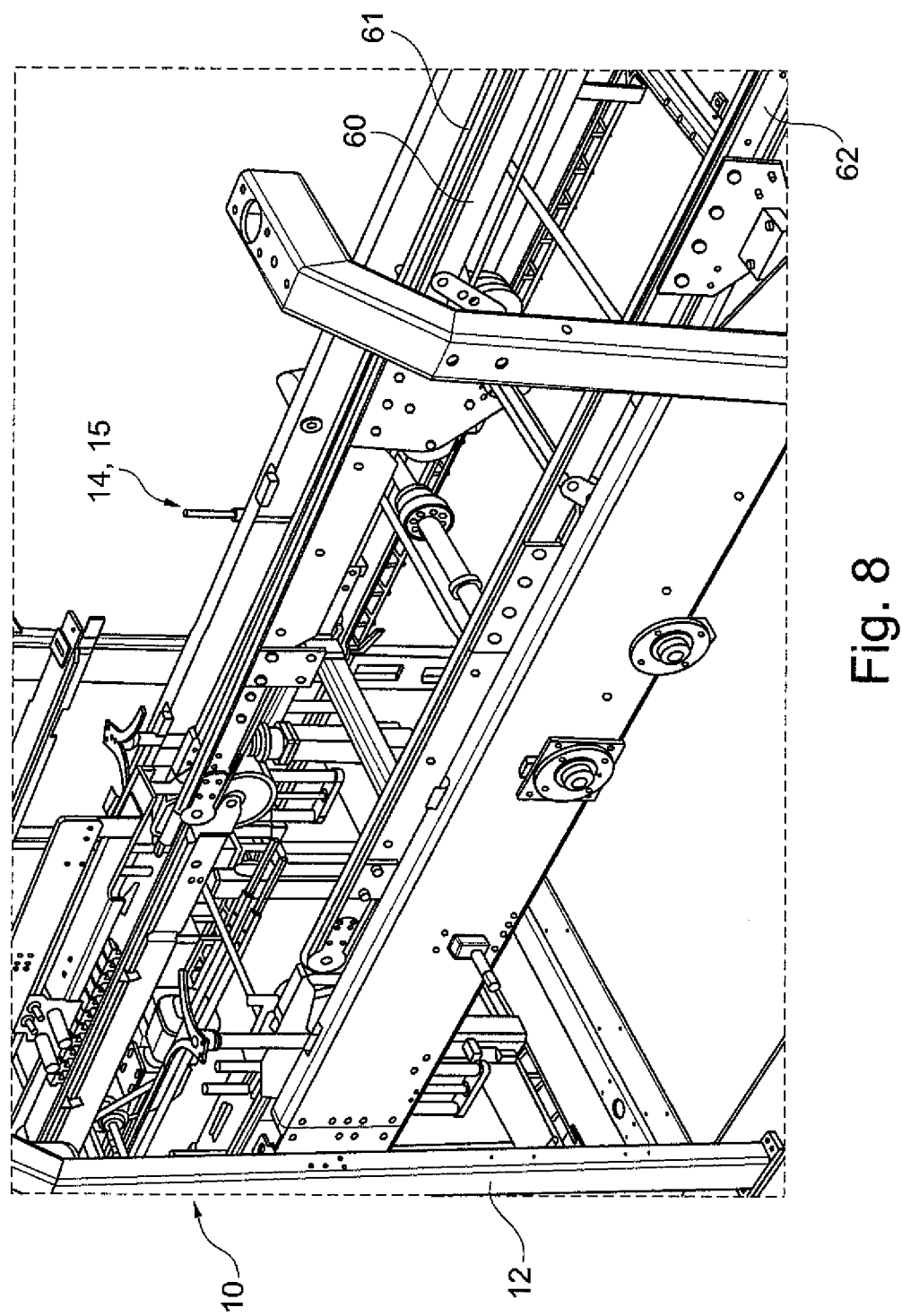

The perspective view in FIG. 6 shows three parallel drive belts 60, 61, and 62, which together form the first conveying means 15 of the first horizontal conveying device 14. In order to remove the first conveying means 15 from the range of the conveying section 10, it is first necessary to undo several locking screws 64 on the rack of the first, middle drive belt 60, to enable pushing the three drive belt units 60, 61, and 62 closely together on cross beams of the machine base frame 12 so that said drive belt units 60, 61, and 62 abut against each other, as is depicted in FIG. 7. The three locking screws 64 are tightened in this position, thereby connecting the middle, first drive belt 60 with the second drive belt 61 located to the right of the first drive belt 60. The drive belt units 60, 61, and 62 may be connected to their racks and secured in their positions, in each case, by means of compression fittings fastened to the cross beams of the machine base frame 12. For changing their positions, these compression fittings have to be undone first, to enable pushing the belt units to the sides of the machine base frame 12 of the conveying section 10, as shown in FIG. 8. This figure also illustrates that the first and second belt drives 60 and 61, which are connected by the locking screws 64, are pushed to the right longitudinal side of the conveying section 10, and the third drive belt unit 62 is pushed to the left longitudinal side of the conveying section 10. In this arrangement, the first conveying means 15 is already no longer ready for use in the first operating position. Further drive and/or manipulation devices for packaging may have to be removed from the engagement range of the conveying section 10, for instance a package forming unit (not illustrated here) located above the conveying level, which may be formed by several circulating belts, each with crosspieces or crossbars or the like attached to them for forming packages during the process of conveying articles. Other such devices as these package forming units are preferably also pushed to the longitudinal sides of the conveying section 10 and secured there in the same manner as described above.

Figure 9:
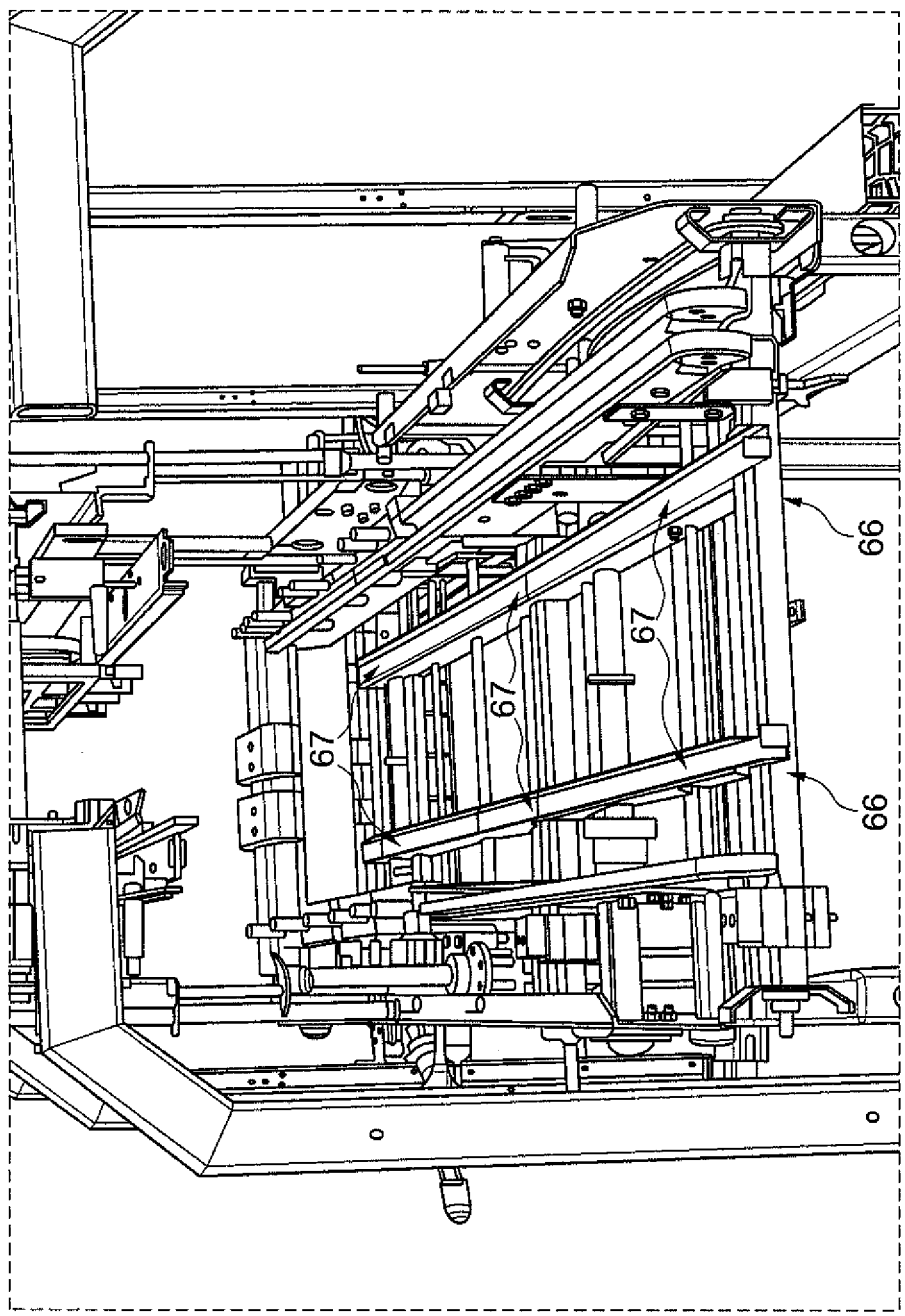
Figure 10:
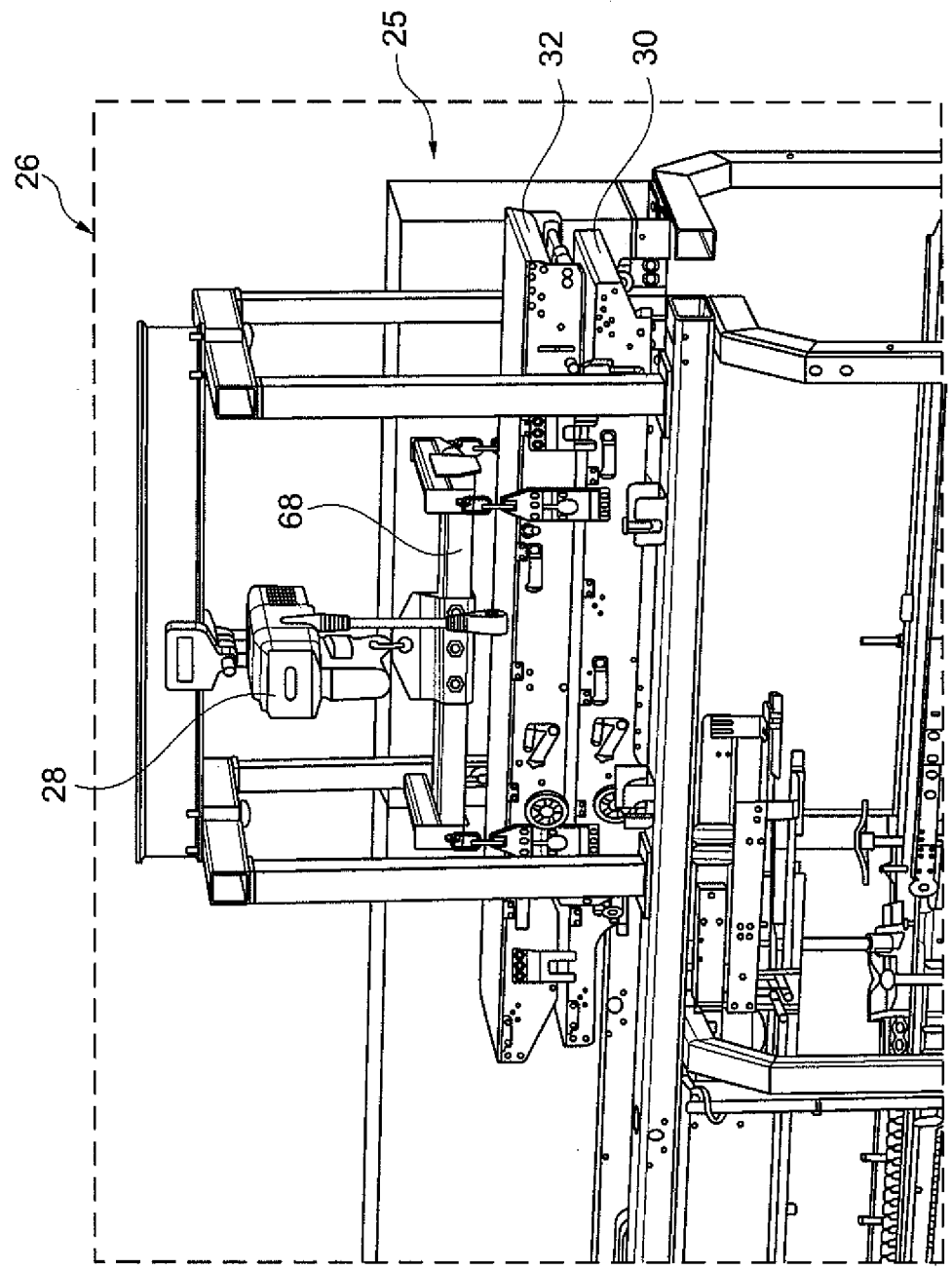

The perspective presentation in FIG. 9 illustrates a further step in the conversion from the first to the second operating mode. It involves inserting at least two parallel guide rails 66 in the range of the conveying section 10, wherein said guide rails 66 were previously located in a rest position on the above-mentioned cross braces or cross beams of the machine base frame 12. In the illustrated exemplary embodiment, these two parallel guide rails 66 consist of a total of six rail segments 67, which serve as guide rails and support for the second conveying means 25, which is to be subsequently installed, and which is intended for article transportation in the second operating mode of the packaging machine 8.

The FIGS. 10 to 18 as described in the following sections show the consecutive steps in installing the second conveying means 25 for establishing the second operating mode of the packaging machine 8. The two parts 30 and 32 of the second conveying means 25 are stacked on top of and connected to each other within the superstructure 26, where they are set aside on cross beams, which may be removed for the purpose of lowering the two parts 30 and 32 by means of the gantry crane 28. The top part 32 of the conveyor module is anchored to a lifting beam 68, which is movable in a vertical direction upward and downward by means of the gantry crane 28. The lower part 30 is commonly anchored to the upper part 32 until the two parts are separated in the range of the conveying section 10, as illustrated in the FIGS. 12 and 13. According to FIG. 10, the conveyor modules of the second conveying means 25, which are connected to the lifting beam 68, are first slightly lifted from their parking position using the chain hoist of the gantry crane 28 so that the cross braces, which are not specified in more detail here, may be removed. The two connected modules of the second conveying means 25 are then lowered onto the rail segments 67 of the guide rails 66 until the lower part 30 comes to rest on the guide rails 66, as shown in FIG. 11. This takes the load off the lifting beam 68, which nevertheless remains shackled to the upper part 32 of the second conveying means 25 for the time being. The two modules 30 and 32 must be lowered to a position where they are moveable in conveying direction along the guide rails 66. In this process step it is particularly important to avoid collisions in the process of lowering the modules 30 and 32 and to position them exactly on the guide rails 66.

Figure 12:
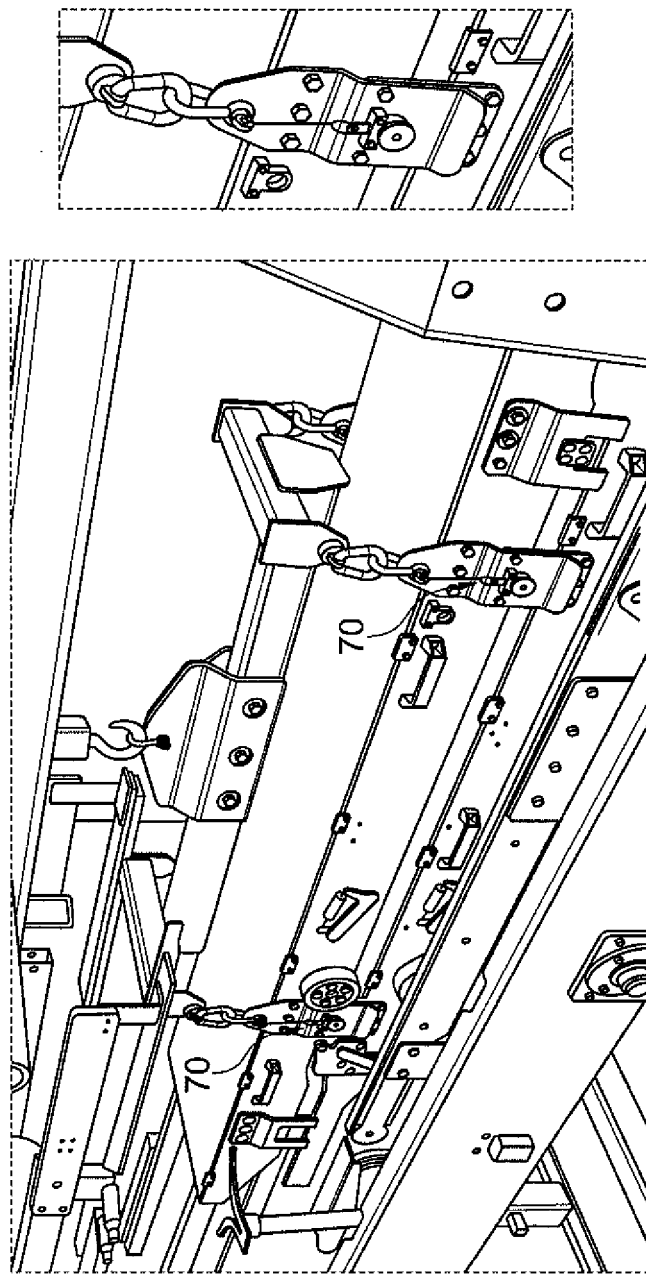
Figure 13:
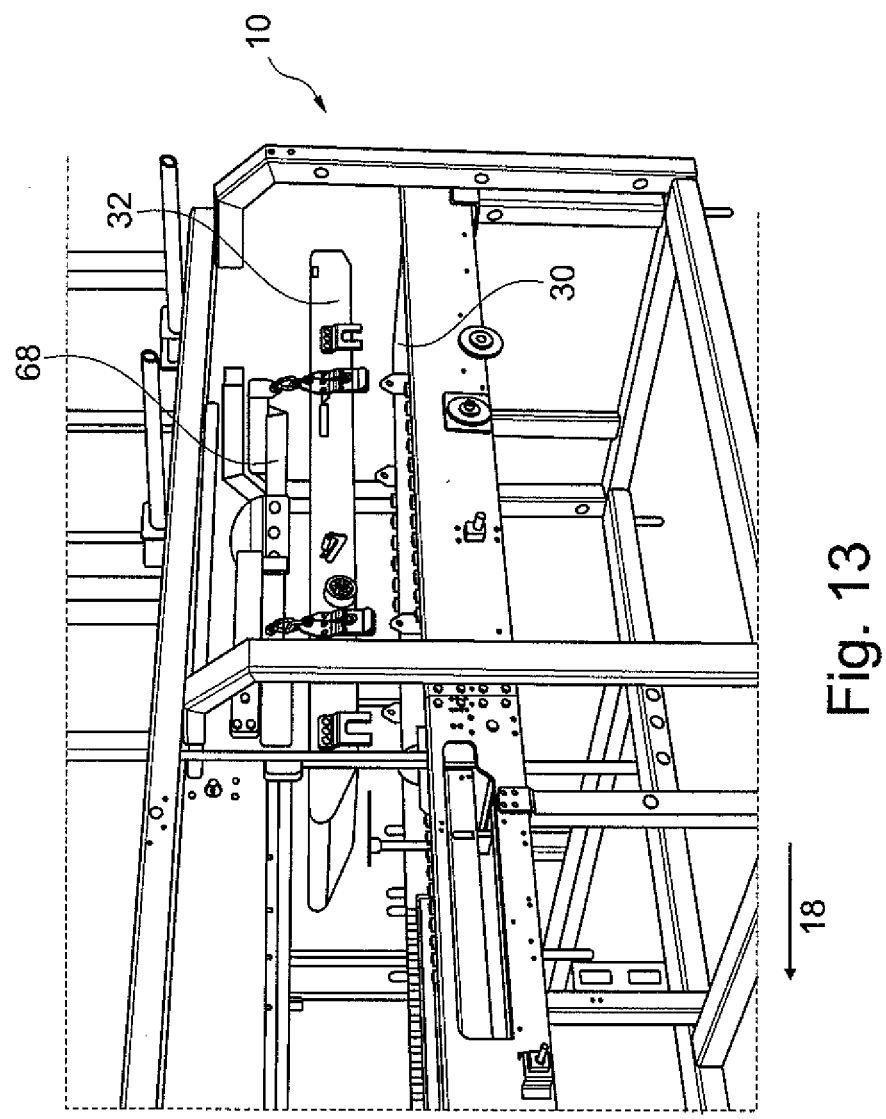

According to FIG. 12, four safety bolts 70 then have to be unbolted at the coupling points between the two modules 30 and 32 so that the two modules may be separated, while the upper part 32 still remains connected to the lifting beam 68. For this purpose, the safety bolts 70 may be switched to a position corresponding to a parking position. With the lower conveyor module 30 now placed moveably in a longitudinal direction on the guide rails 66 and the lifting beam 68 of the gantry crane 28 still attached to the upper conveyor module 32, it is possible to slightly lift the said module 32, according to FIG. 13, in order to slide the lower conveyor module 30 along the conveying direction 18 of the conveying section 10 smoothly and without jamming.

Figure 14:
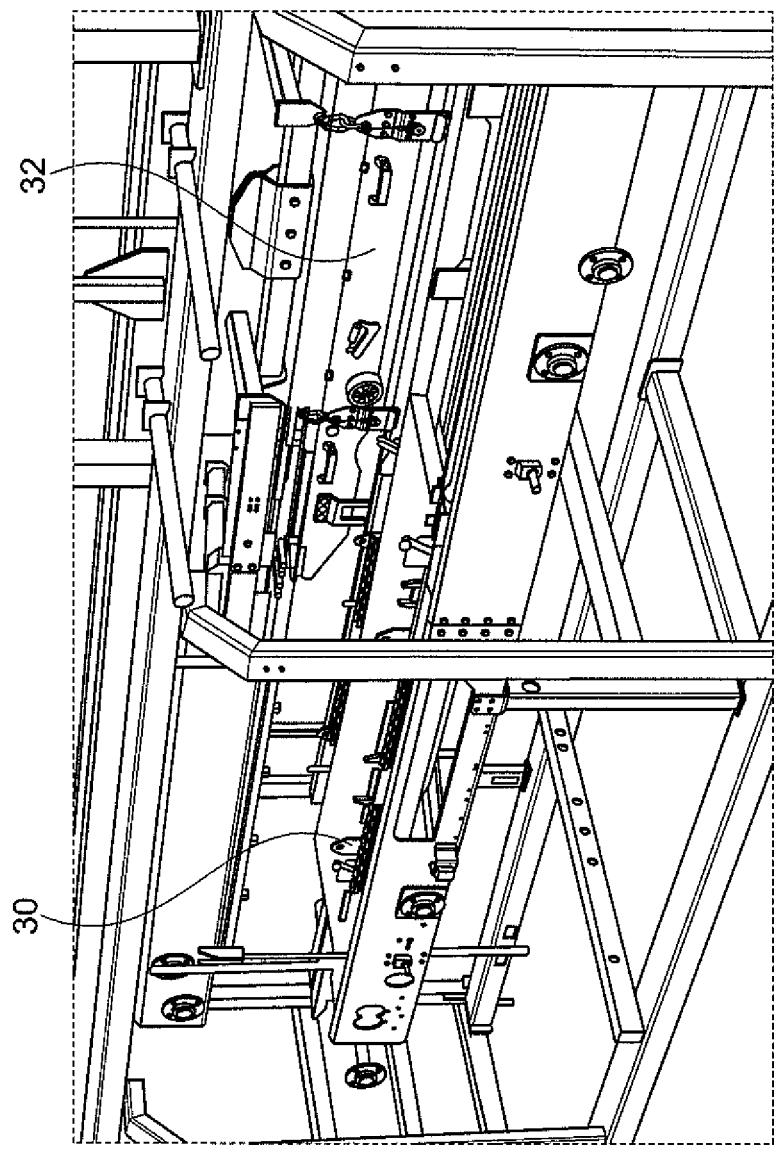
Figure 15:
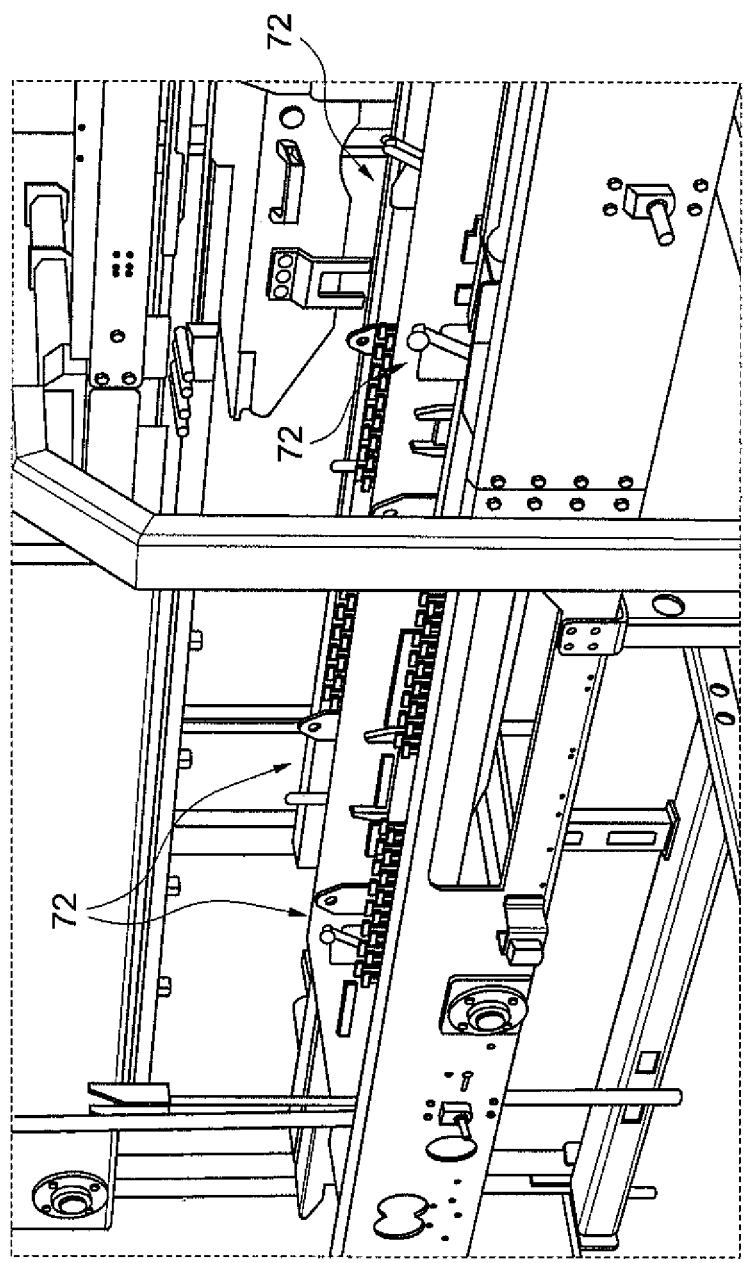

FIG. 14 illustrates the process of sliding the lower conveyor module 30 in conveying direction 18 to its work position between the sealing chains of the package forming unit. It is additionally possible to define the correct end position for the module 30 by providing a mechanism for the module 30 to snap in place. In order to reduce the risk of damaging any drive elements, such as gearwheels, in the engagement area, the sliding process must be conducted slowly and carefully. FIG. 15 gives another illustration of the lower conveyor module 30 being secured in its work position to establish the second operating state of the packaging machine 8. The lower part of the conveyor module 30 is locked by means of four safety levers 72, which can be pivoted for slightly lifting the module 30 to shift and secure it in a defined work position, if necessary.

Figure 16:
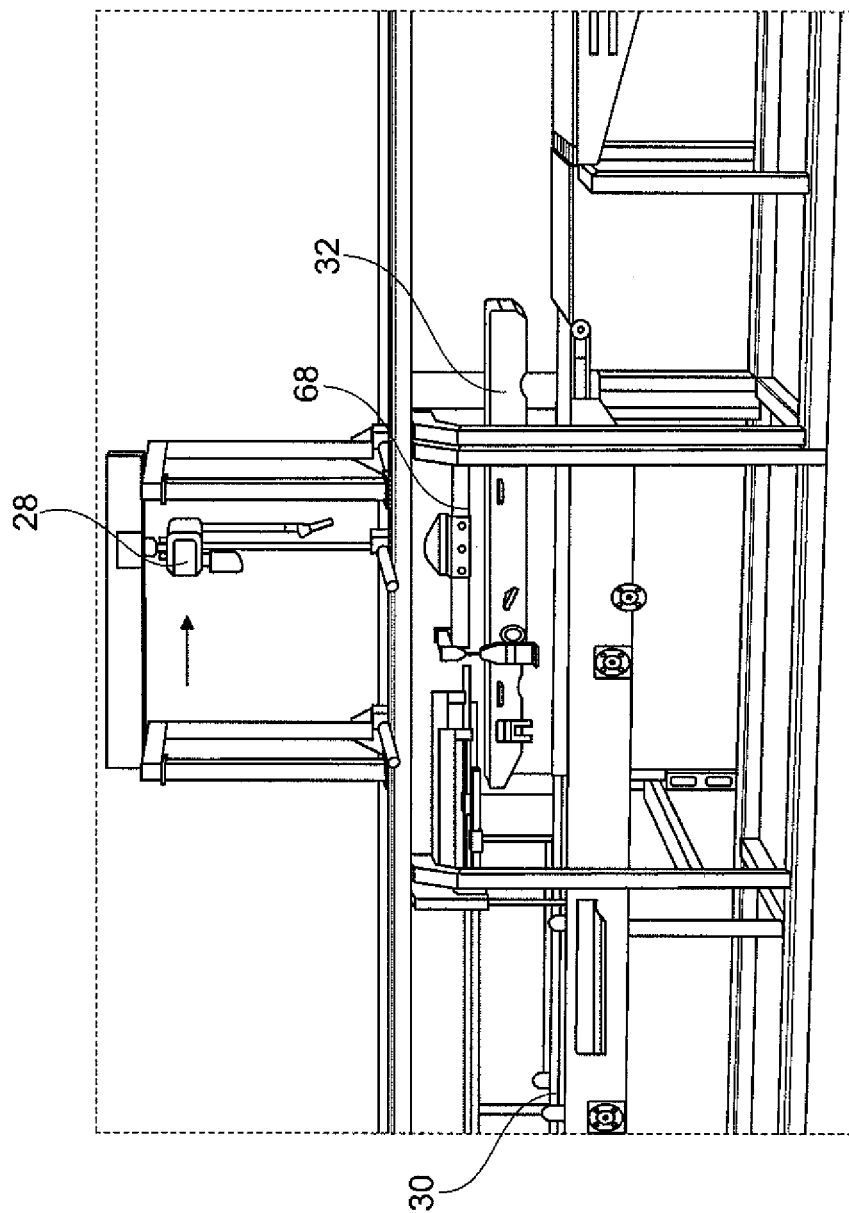
Figure 17:
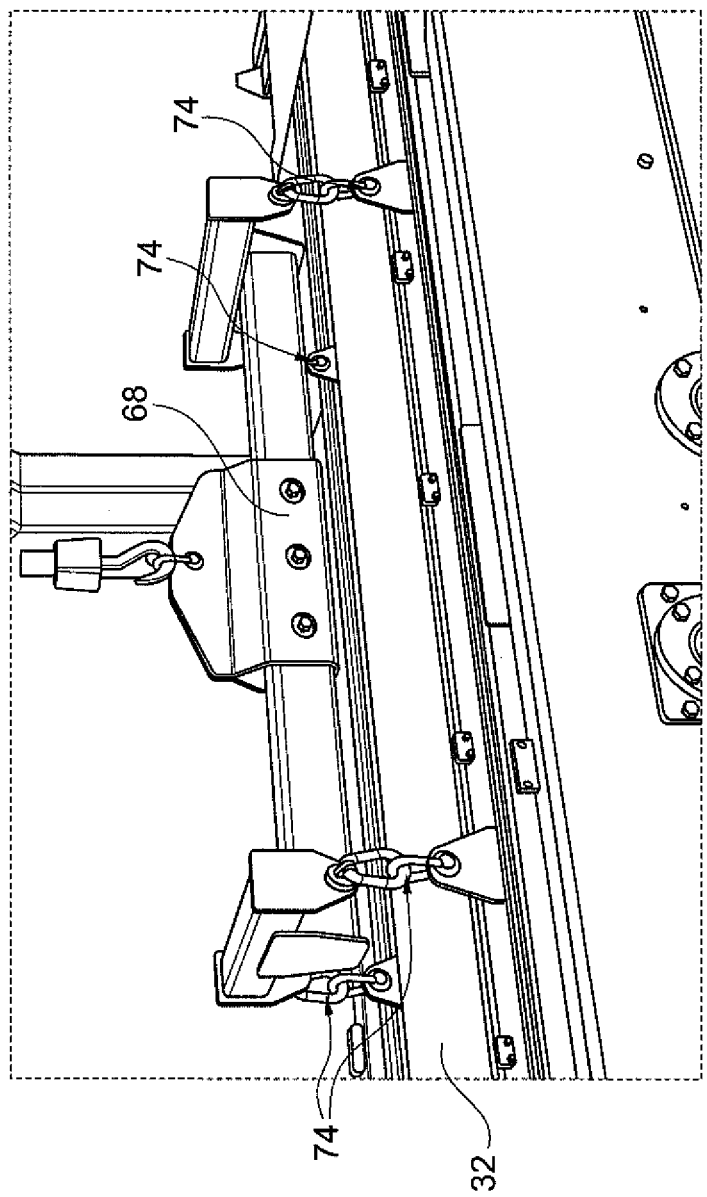
Figure 18:
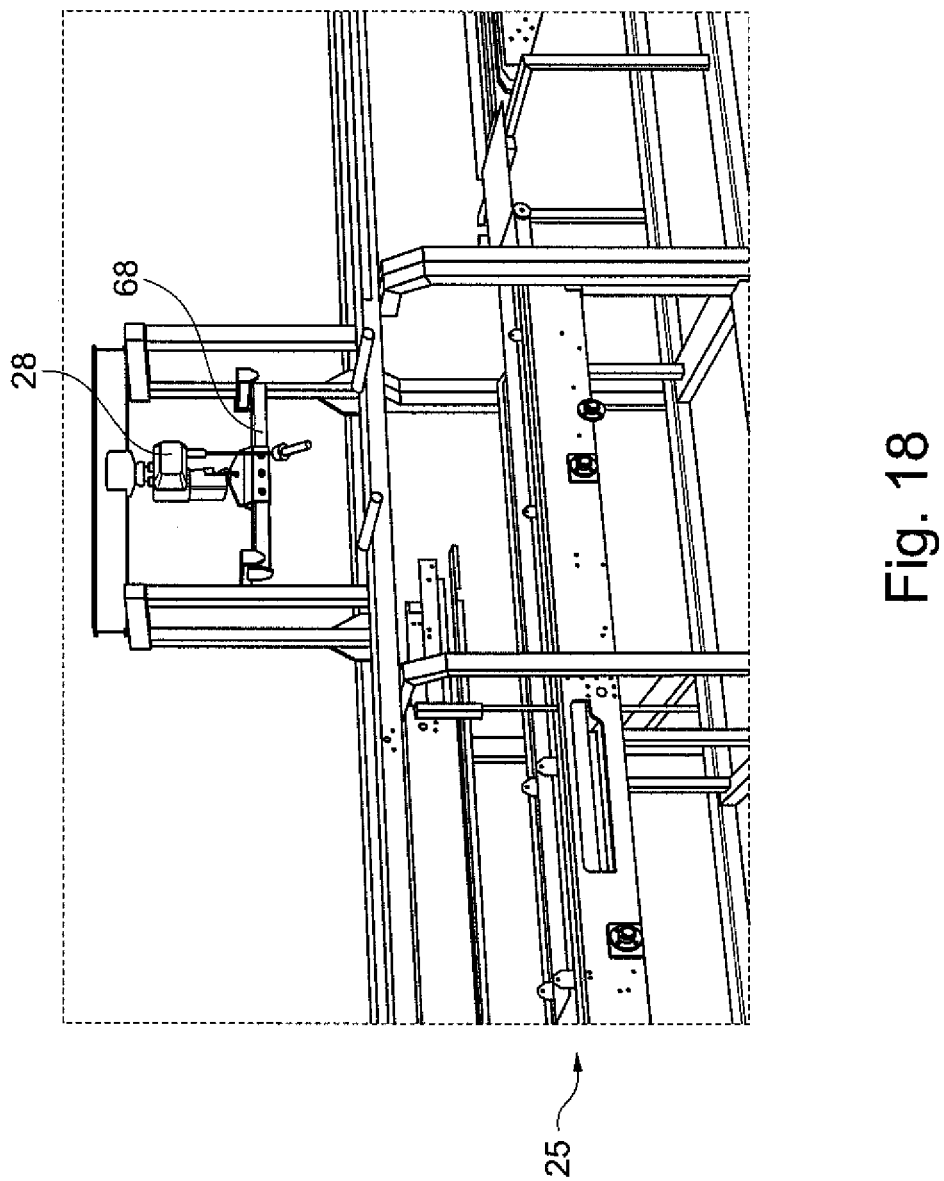

According to FIG. 16, the gantry crane 28 is then shifted in the direction of the arrow and against the conveying direction and the lifting beam 68 with the upper conveyor module 32 suspended from it is moved downward to the correct lower position. This lower position may be defined by a horizontal end stop at the chain hoist, for instance. The mounting tabs arranged laterally at the rack of the upper conveyor module 32 are lowered to come to rest on corresponding support points on the sides of the guide rails 66, and the correct position of all four or more mounting tabs should be checked. It is then possible to separate the lifting beam 68 from the upper conveyor module 32 by releasing the four load shackles 74, as is indicated in FIG. 17. The illustration in FIG. 8 shows the lifting beam 68 with the chain hoist of the gantry crane 28 being subsequently raised to the top end position. The second conveying means 25 with the two consecutive conveyor modules 30 and 32 are arranged with as little interspace as possible at the point where they meet and are now in the desired second operating mode and ready to use. If required, the lifting beam 68 may additionally be secured, for instance by means of the cross braces that were previously used as support for the second conveying means in its rest position. The lifting beam 68 may also be optionally lowered onto these cross braces to the point where the chain of the gantry crane is relaxed. It is moreover possible to install further guide elements, if this is required. These may be guide rails for the cardboard blanks at a transfer point to the blank feed or the like.

For disassembling the second conveying means 25 and replacing it by the first conveying means 15 to establish the first operating mode of the packaging machine 8, the work steps are conducted in reverse order to the assembly as described above by means of the FIGS. 6 to 18.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

- 8 Machine, packaging machine
- 10 Conveying section
- 12 Machine base frame
- 14 First horizontal conveying device
- 15 First conveying means
- 16 Conveyor belt
- 17 Manipulation element
- 18 Conveying direction
- 20 Right half
- 22 Left half
- 24 Second horizontal conveying device
- 25 Second conveying means
- 26 Superstructure
- 28 Gantry crane
- 30 Lower part, lower conveyor module
- 32 Upper part, upper conveyor module
- 34 Longitudinal rails
- 36 Drive roll
- 38 Gear pair
- 40 Conveyor mat
- 42 Gap, interspace
- 44 Drive roll
- 46 Rack
- 48 Clamping lever
- 50 Clamping jaw
- 52 Clamping rail
- 54 Drawbar eye
- 60 First drive belt, first drive belt unit
- 61 Second drive belt, second drive belt unit
- 62 Third drive belt, third drive belt unit
- 64 Locking screw
- 66 Guide rail
- 67 Rail segment
- 68 Lifting beam
- 70 Safety bolt
- 72 Safety lever
- 74 Load shackle

What is claimed is:

1. A machine for processing and/or packaging objects comprising:
   a horizontal conveying section for conveying articles, packages and/or packaging units, the conveying section including a first horizontal conveying device with at least one first conveyor for a first operating mode, the first horizontal conveying device replaceable by a second horizontal conveying device with at least one second conveyor different from the first conveyor in order to establish at least one second operating mode, the second horizontal conveying device taking a second horizontal conveying device position in the second operating mode that replaces a first horizontal conveying device position of the first horizontal conveying device during the first operating mode; the at least one first conveyor including circulating conveyor chains adapted for conveying the articles, packages or packaging units in groups on support pads, with flap folding fingers capable of emerging from below a level of conveyance, the second conveyor being different from the first conveyor and having a flat conveyor support surface capable of transporting the articles, packages or packaging units without the support pads in the groups; and
   a hoist setting aside the second horizontal conveying device in a rest position above a conveying level in the first operating mode.

2. The machine as recited in claim 1, wherein the first conveyor is removable in a horizontal and/or vertical direction from the conveying section and then replaceable by the second horizontal conveying device including an endlessly circulating support surface which takes a position of a conveyance route and forms part of the conveying section in the second operating mode.

3. The machine as recited in claim 2, wherein the second horizontal conveyor device is multi-part so as to include a second endlessly circulating support surface.

4. The machine as recited in claim 1, wherein the first horizontal conveying device includes at least two parts and includes a parting line in a longitudinal or conveying direction.

5. The machine as recited in claim 4, the at least two parts of the first horizontal conveying device are joined at the parting line or placed at a distance from each other to permit the articles, packages and/or packaging units to be conveyed over the parting line or the distance in the first operating mode.

6. The machine as recited in claim 4, wherein the at least two parts of the first horizontal conveying device are pulled apart at the parting line in both directions to sides of the conveying section and placed at a distance from each other for the second operating mode.

7. The machine as recited in claim 1, wherein the second horizontal conveying device is separated in a conveying direction and formed by two or more parts joined to each other in the second operating mode.

8. The machine as recited in claim 7, wherein the at least two parts of the second horizontal conveying device are vertically stacked on top of each other and/or connected to each other.

9. The machine as recited in claim 8, wherein the at least two parts of the second horizontal conveying device are coupled into or out of the rest position by a hoist for vertically lifting and lowering the second horizontal conveying device.

10. The machine as recited in claim 8, wherein at least one part of the second horizontal conveying device is slidable in a conveying direction in order to establish the second operating position.

11. The machine as recited in claim 1, wherein two or more parts of the second horizontal conveying device are spaced apart from each other in the second operating mode, forming a gap with the curvature radiuses of the belt tracks facing toward each other, the gap sized to permit the articles, packages and/or packaging units to be conveyed thereover.

12. The machine as recited in claim 1, wherein the first horizontal conveying device and the second horizontal conveying device are each couplable to a same drive of the conveying section.

13. A method for modifying a conveying section of a machine for processing and/or packaging objects, the method comprising:
conveying articles, packages and/or packaging units horizontally on the conveying section via a first horizontal conveying device with at least one first conveyor in a first operating mode, the at least one first conveyor including circulating conveyor chains adapted for conveying the articles, packages or packaging units in groups on support pads, with flap folding fingers capable of emerging from below a level of conveyance; and
establishing at least one second operating mode by replacing the first horizontal conveying device with a second horizontal conveying device including at least one second conveyor different from the first conveyor, the second conveyor having a flat conveyor support surface capable of transporting the articles, packages or packaging units without the support pads in the groups, the second horizontal conveying device taking a second horizontal conveying device position in the second operating mode that replaces a first horizontal conveying device position of the first horizontal conveying device during the first operating mode;
the second horizontal conveying device being set aside in a rest position above a conveying level in the first operating mode,
the circulating conveyor chains of the at least one first conveyor being displaced to at least one of the right and left longitudinal sides of the conveying section in the second operating mode, the at least one second conveyor being installed beside or between the circulating conveyor chains of the at least one first conveyor in the second operating mode.

14. The method as recited in claim 13, wherein the conveying section is at least in parts formed by the first horizontal conveying device in a first operating mode, said first horizontal conveying device being formed by at least one endlessly circulating conveyor belt which, for the purpose of switching to a second operating mode, is removed in a horizontal and/or vertical direction from a conveyance route for the articles, packages, and/or packaging units and replaced by a second horizontal conveying device including at least one endlessly circulating support surface, the second horizontal conveying device taking the position of the conveyance route and forming at least a part of the conveying section in the second operating mode.

15. The method as recited in claim 13, wherein the first horizontal conveying device is formed by multiple parts and comprises a parting line in a longitudinal or conveying direction, the at least two parts of the first horizontal conveying device being joined together or spaced only slightly apart at the parting line and functioning as a single horizontal conveying device for the first operating mode, the at least two parts of the first horizontal conveying device being pulled apart at the parting line in both directions to the sides of the conveying section and placed at a distance from each other for the second operating mode.

16. The method as recited in claim 13, wherein the second horizontal conveying device is separated in a conveying direction and formed by two or more parts in the second operating mode, which parts are joined to each other, wherein the at least two parts of the multi-part second horizontal conveying device being vertically stacked on top of each other and/or connected to each other, and the at least two parts of the multi-part second horizontal conveying device being coupled into or out of the rest position by a hoist for vertically lifting and lowering said horizontal conveying device.

17. The method as recited in claim 13, wherein at least one part of the multi-part second horizontal conveying device is slidable in a conveying direction in order to establish the second operating position.

18. A machine for processing and/or packaging objects, comprising:
a horizontal conveying section for conveying articles, packages and/or packaging units, the conveying section including a first horizontal conveying device with at least one first conveyor for a first operating mode, the first horizontal conveying device replaceable by a second horizontal conveying device with at least one second conveyor different from the first conveyor in order to establish at least one second operating mode,
wherein the first conveyor is removable in a horizontal and/or vertical direction from the range of the conveying section for the articles, packages, and/or packaging units and then replaceable by the second horizontal conveying device, the second horizontal conveying device being multi-part with each part comprising at least one endlessly circulating support surface taking the position of the conveyance route and forming part of the conveying section in the second operating mode; the second horizontal conveying device taking a second horizontal conveying device position in the second operating mode that replaces a first horizontal conveying device position of the first horizontal conveying device during the first operating mode;
wherein the second horizontal conveying device is set in a rest position above a conveying level during the first operating mode; and
wherein each of the first and second conveying devices and/or first and second conveyors is provided with an individual drive.

19. The machine as recited in claim 18, wherein the individual drive is a flange mounted electric motor.

* * * * *